(12) United States Patent
Richter

(10) Patent No.: US 10,772,774 B2
(45) Date of Patent: Sep. 15, 2020

(54) SELF-BALANCING WHEELCHAIR

(71) Applicant: Max Mobility, LLC, Antioch, TN (US)

(72) Inventor: Mark Richter, Nashville, TN (US)

(73) Assignee: Max Mobility, LLC, Labanon, TN (US)

( * ) Notice: Subject to any disclaimer, the term of this patent is extended or adjusted under 35 U.S.C. 154(b) by 182 days.

(21) Appl. No.: 15/670,488

(22) Filed: Aug. 7, 2017

(65) Prior Publication Data

US 2018/0042797 A1    Feb. 15, 2018

Related U.S. Application Data

(60) Provisional application No. 62/416,806, filed on Nov. 3, 2016, provisional application No. 62/405,572, filed (Continued)

(51) Int. Cl.
*A61G 5/04* (2013.01)
*A61G 5/10* (2006.01)
*A61G 5/06* (2006.01)

(52) U.S. Cl.
CPC .............. *A61G 5/1078* (2016.11); *A61G 5/04* (2013.01); *A61G 5/041* (2013.01); *A61G 5/06* (2013.01);
(Continued)

(58) Field of Classification Search
CPC ........ A61G 5/1078; A61G 5/04; A61G 5/041; A61G 5/10; A61G 2203/14; A61G 2200/34; A61G 2203/36; B60L 2200/34; B60L 2220/42; B60L 2220/46; B60L 2240/12; B60L 2240/14; B60L 2240/26; Y02T 10/646; Y02T 10/7258; B62D 37/00; B62D 37/04; B62D 49/08; B62D 49/085
See application file for complete search history.

(56) References Cited

U.S. PATENT DOCUMENTS 3,529,688 A    9/1970    Bruce
4,715,460 A    12/1987    Smith
(Continued)

FOREIGN PATENT DOCUMENTS

CN    202437494    9/2012
CN    202537802    11/2012
(Continued)

OTHER PUBLICATIONS

International Searching Authority dated Nov. 3, 2017, for Application No. PCT/US2017/045872.
(Continued)

*Primary Examiner* — Jacob D Knutson
*Assistant Examiner* — Marlon A Arce
(74) *Attorney, Agent, or Firm* — McAndrews, Held & Malloy, Ltd.

(57) ABSTRACT

The presently disclosure describes a system for stabilizing a wheelchair. The system includes at least one caster arm configured to maintain contact with a surface underlying the wheelchair. The at least one caster arm includes a force sensing system configured to measure a force exerted on the underlying surface by the at least one caster arm; and an actuator to configured adjust a position of the at least one caster arm based at least in part on the measured force.

19 Claims, 14 Drawing Sheets

Related U.S. Application Data on Oct. 7, 2016, provisional application No. 62/373,011, filed on Aug. 10, 2016.

(52) U.S. Cl.
CPC ............ *A61G 5/10* (2013.01); *A61G 2203/14* (2013.01); *A61G 2203/36* (2013.01); *B60L 2200/34* (2013.01); *B60L 2220/42* (2013.01); *B60L 2220/46* (2013.01); *B60L 2240/12* (2013.01); *B60L 2240/14* (2013.01); *B60L 2240/26* (2013.01); *Y02T 10/646* (2013.01); *Y02T 10/7258* (2013.01)

(56) References Cited

U.S. PATENT DOCUMENTS

| | | | |
|---|---|---|---|
| 4,790,548 | A | 12/1988 | Decelles et al. |
| 5,044,647 | A | 9/1991 | Patterson |
| 5,403,251 | A | 4/1995 | Belsito et al. |
| 5,701,965 | A | 12/1997 | Kamen et al. |
| 5,791,425 | A | 8/1998 | Kamen et al. |
| 5,904,214 | A | 5/1999 | Lin |
| 5,944,131 | A | 8/1999 | Schaffner et al. |
| 5,947,559 | A | 9/1999 | Williams |
| 5,964,473 | A | 10/1999 | Degonda et al. |
| 5,971,091 | A | 10/1999 | Kamen et al. |
| 5,975,225 | A | 11/1999 | Kamen et al. |
| 6,062,600 | A | 5/2000 | Kamen et al. |
| 6,068,280 | A | 5/2000 | Torres |
| 6,092,249 | A | 7/2000 | Kamen et al. |
| 6,176,335 | B1 | 1/2001 | Schaffner et al. |
| 6,206,393 | B1 | 3/2001 | Mascari et al. |
| 6,209,670 | B1 | 4/2001 | Fernie et al. |
| 6,302,230 | B1 | 10/2001 | Kamen et al. |
| 6,311,794 | B1 | 11/2001 | Morrell et al. |
| 6,357,776 | B1 | 3/2002 | Goertzen et al. |
| 6,367,817 | B1 | 4/2002 | Kamen et al. |
| 6,386,576 | B1 | 5/2002 | Kamen et al. |
| 6,390,554 | B1 | 5/2002 | Eakins et al. |
| 6,405,816 | B1 | 6/2002 | Kamen et al. |
| 6,425,635 | B1 | 7/2002 | Pulver |
| 6,443,250 | B1 | 9/2002 | Kamen et al. |
| 6,443,251 | B1 | 9/2002 | Morrell et al. |
| 6,543,564 | B1 | 4/2003 | Kamen et al. |
| 6,547,026 | B2 | 4/2003 | Kamen et al. |
| 6,554,086 | B1 | 4/2003 | Goertzen et al. |
| 6,571,892 | B2 | 6/2003 | Kamen et al. |
| 6,581,714 | B1 | 6/2003 | Kamen et al. |
| 6,651,766 | B2 | 11/2003 | Kamen et al. |
| 6,715,784 | B2 | 4/2004 | Koerlin et al. |
| 6,715,845 | B2 | 4/2004 | Kamen et al. |
| 6,779,621 | B2 | 8/2004 | Kamen et al. |
| 6,796,396 | B2 | 9/2004 | Kamen et al. |
| 6,799,649 | B2 | 10/2004 | Kamen et al. |
| 6,915,878 | B2 | 7/2005 | Kamen et al. |
| 6,923,278 | B2 | 8/2005 | Mulhern et al. |
| 6,923,280 | B2 | 8/2005 | Goertzen et al. |
| 6,929,080 | B2 | 8/2005 | Kamen et al. |
| 6,938,923 | B2 | 9/2005 | Mulhern et al. |
| 6,965,206 | B2 | 11/2005 | Kamen et al. |
| 6,969,079 | B2 | 11/2005 | Kamen et al. |
| 6,976,699 | B2 | 12/2005 | Koerlin |
| 7,004,271 | B1 | 2/2006 | Kamen et al. |
| 7,017,686 | B2 | 3/2006 | Kamen et al. |
| 7,023,330 | B2 | 4/2006 | Kamen et al. |
| 7,040,429 | B2 | 5/2006 | Molnar |
| 7,044,553 | B2 | 5/2006 | Ropp |
| 7,090,040 | B2 | 8/2006 | Kamen et al. |
| 7,131,706 | B2 | 11/2006 | Kamen et al. |
| 7,157,875 | B2 | 1/2007 | Kamen et al. |
| 7,174,976 | B2 | 2/2007 | Kamen et al. |
| 7,210,544 | B2 | 5/2007 | Kamen et al. |
| 7,219,755 | B2 | 5/2007 | Goertzen et al. |
| 7,219,924 | B2 | 5/2007 | Mulhern et al. |
| 7,264,272 | B2 | 9/2007 | Mulhern et al. |
| 7,273,116 | B2 | 9/2007 | Kamen et al. |
| 7,275,607 | B2 | 10/2007 | Kamen et al. |
| 7,314,220 | B2 | 1/2008 | Turturiello et al. |
| 7,316,282 | B2 | 1/2008 | Mulhern et al. |
| 7,316,405 | B2 | 1/2008 | Kritman et al. |
| 7,318,628 | B2 | 1/2008 | Guile |
| 7,344,155 | B2 | 3/2008 | Mulhern et al. |
| 7,360,792 | B2 | 4/2008 | Turturiello et al. |
| 7,370,713 | B1 | 5/2008 | Kamen |
| 7,407,175 | B2 | 8/2008 | Kamen et al. |
| 7,426,970 | B2 | 9/2008 | Olsen |
| 7,469,760 | B2 | 12/2008 | Kamen et al. |
| 7,516,984 | B2 | 4/2009 | Tang |
| 7,537,069 | B2 * | 5/2009 | Kramer ............... A47C 7/62 180/21 |
| 7,546,889 | B2 | 6/2009 | Kamen et al. |
| 7,562,903 | B2 | 7/2009 | Kramer, Jr. et al. |
| 7,566,102 | B2 | 7/2009 | Guile |
| 7,569,002 | B2 | 8/2009 | Nativ |
| 7,581,604 | B2 | 9/2009 | Torita |
| 7,597,163 | B2 | 10/2009 | Goertzen et al. |
| 7,614,699 | B2 | 11/2009 | Torres et al. |
| 7,635,164 | B2 | 12/2009 | Torres et al. |
| 7,690,447 | B2 | 4/2010 | Kamen et al. |
| 7,690,452 | B2 | 4/2010 | Kamen et al. |
| 7,757,794 | B2 | 7/2010 | Heinzmann et al. |
| 7,823,676 | B2 | 11/2010 | Yamada et al. |
| 7,896,394 | B2 | 3/2011 | Jackson et al. |
| 7,900,725 | B2 | 3/2011 | Heinzmann et al. |
| 7,938,207 | B2 | 5/2011 | Kamen et al. |
| 7,942,445 | B2 | 5/2011 | Kramer, Jr. et al. |
| 8,061,755 | B2 | 11/2011 | Brendel et al. |
| 8,073,575 | B2 | 12/2011 | Tachibana et al. |
| 8,108,104 | B2 * | 1/2012 | Hrovat ............... B60G 17/0162 180/209 |
| 8,118,321 | B2 | 2/2012 | Hunziker et al. |
| 8,172,016 | B2 | 5/2012 | Goertzen et al. |
| 8,186,463 | B2 | 5/2012 | Hunziker et al. |
| 8,272,461 | B2 | 9/2012 | Bekoscke et al. |
| 8,286,738 | B2 | 10/2012 | Cheng |
| 8,297,388 | B2 | 10/2012 | Lindenkamp et al. |
| 8,322,477 | B2 | 12/2012 | Kamen et al. |
| 8,322,741 | B2 | 12/2012 | Laslo et al. |
| 8,413,749 | B2 * | 4/2013 | Hsu ................ A61G 5/045 180/65.51 |
| 8,453,768 | B2 | 6/2013 | Kamen et al. |
| 8,474,848 | B2 | 7/2013 | Bematsky et al. |
| 8,534,679 | B2 | 9/2013 | Goertzen et al. |
| 8,556,279 | B2 | 10/2013 | McKinnon |
| 8,561,736 | B2 | 10/2013 | Nelson et al. |
| 8,565,982 | B2 | 10/2013 | Lofstrand |
| 8,573,341 | B2 | 11/2013 | Fought |
| 8,636,089 | B2 | 1/2014 | Goertzen et al. |
| 8,684,398 | B1 | 4/2014 | Nyitray |
| 8,738,278 | B2 | 5/2014 | Chen |
| 8,789,632 | B2 | 7/2014 | Maurer et al. |
| 8,833,774 | B2 | 9/2014 | Goertzen et al. |
| 8,910,975 | B2 | 12/2014 | Bekoscke et al. |
| 9,010,470 | B2 | 4/2015 | Cuson et al. |
| 9,073,399 | B1 | 7/2015 | Richter |
| 9,149,398 | B2 | 10/2015 | Goertzen et al. |
| 9,168,966 | B2 | 10/2015 | Field et al. |
| 9,188,984 | B2 | 11/2015 | Kamen et al. |
| 9,193,407 | B2 * | 11/2015 | Muth ................ B62J 99/00 |
| 9,278,036 | B2 | 3/2016 | Lee |
| 9,346,335 | B2 | 5/2016 | Bekoscke et al. |
| 9,364,375 | B2 | 6/2016 | Youngmann et al. |
| 9,364,377 | B2 | 6/2016 | Goertzen et al. |
| 89,411,336 | | 8/2016 | Kamen et al. |
| 2004/0004390 | A1 | 1/2004 | Guile |
| 2004/0094944 | A1 * | 5/2004 | Goertzen ............... A61G 5/043 280/755 |
| 2005/0046129 | A1 | 3/2005 | Antonishak et al. |
| 2005/0280302 | A1 | 12/2005 | Ropp |
| 2005/0288157 | A1 * | 12/2005 | Santos-Munne ....... A61H 3/008 482/66 |
| 2006/0021806 | A1 | 2/2006 | Goertzen et al. |
| 2006/0079817 | A1 | 4/2006 | Dewald et al. |
| 2006/0091663 | A1 | 5/2006 | Jackson et al. |

(56) References Cited

U.S. PATENT DOCUMENTS

| | | |
|---|---|---|
| 2007/0039765 A1 | 2/2007 | Lin |
| 2007/0145711 A1 | 6/2007 | Mulhern et al. |
| 2007/0152427 A1 | 7/2007 | Olsen |
| 2007/0232464 A1 | 10/2007 | Chu |
| 2008/0097254 A1 | 4/2008 | Torres et al. |
| 2008/0169136 A1 | 7/2008 | Meyer |
| 2008/0173493 A1* | 7/2008 | Adachi .............. B60L 15/20 180/218 |
| 2008/0272560 A1 | 11/2008 | Voss |
| 2009/0115149 A1 | 5/2009 | Wallis et al. |
| 2011/0083915 A1 | 4/2011 | Nelson et al. |
| 2011/0172886 A1* | 7/2011 | Taira .............. A61G 5/04 701/49 |
| 2011/0204592 A1 | 8/2011 | Johansen et al. |
| 2012/0256459 A1 | 10/2012 | Nilsson et al. |
| 2012/0283929 A1* | 11/2012 | Wakita .............. A61G 5/04 701/99 |
| 2013/0008732 A1 | 1/2013 | Richter |
| 2014/0191489 A1 | 7/2014 | Kang et al. |
| 2014/0262575 A1 | 9/2014 | Richter |
| 2014/0326522 A1 | 11/2014 | Maurer et al. |
| 2014/0339391 A1 | 11/2014 | Hsu |
| 2015/0008051 A1 | 1/2015 | Halsall |
| 2015/0190292 A1* | 7/2015 | Robins .............. A61G 5/125 180/366 |
| 2015/0283010 A1 | 10/2015 | Cuson et al. |
| 2016/0022516 A1 | 1/2016 | Goertzen et al. |
| 2016/0041558 A1 | 2/2016 | Field et al. |
| 2016/0158078 A1 | 6/2016 | Kim et al. |
| 2016/0158079 A1 | 6/2016 | Pompel et al. |
| 2016/0256339 A1 | 9/2016 | Goertzen et al. |
| 2016/0318367 A1 | 11/2016 | Bekoscke et al. |
| 2016/0340162 A1* | 11/2016 | Standard .............. B62B 5/00 |

FOREIGN PATENT DOCUMENTS

| | | |
|---|---|---|
| CN | 102309381 | 10/2013 |
| CN | 203915266 | 11/2014 |
| CN | 105640721 | 6/2016 |
| DE | 202014103134 | 10/2014 |
| DE | 202015105515 | 12/2015 |
| EP | 0806929 | 11/2004 |
| EP | 2606867 | 6/2013 |
| EP | 2606869 | 6/2013 |
| EP | 2606867 | 11/2015 |
| EP | 2995540 | 3/2016 |
| WO | 8906117 | 7/1989 |
| WO | 2005039473 | 5/2005 |
| WO | 2008100759 | 8/2008 |
| WO | 2016001451 | 1/2016 |

OTHER PUBLICATIONS

International Searching Authority dated Jan. 16, 2018, for Application No. PCT/US2017/045872.
NINO Robotics, The First Personal Transporter for Everyone and Including Revolutionary Technical Specifications!, Brochure, Captured from the internet Aug. 8, 2017, 1 page.
The Verge, Toyota is remaking the iBot, a stair-climbing wheelchair that was ahead of its time, Article by James Vincent, May 23, 2016, 4 pages.
SmartChair, Self-Balancing Wheelchair goes Hands-Free, Article by Roland Reznik, Mar. 29, 2016, 4 pages.
International Searching Authority dated Oct. 23, 2015, for Application No. PCT/US2015/043534.
Sunrise Medical, Quickie QM-7 Series Power Wheelchairs, Product Specifications Sheet, Sep. 2015, 4 pages.
Office Action dated Mar. 31, 2015 for U.S. Appl. No. 14/590,129.
Office Action dated Sep. 25, 2014 for U.S. Appl. No. 14/053,047.
Wikipedia website, http://en.wikipedia.org/wiki/Inertial_measurement_unit, Inertial measurement unit, last modified on Aug. 24, 2014, printed from the Internet on Oct. 10, 2014, 4 pages.
Wikipedia website, http://en.wikipedia.org/wiki/Stewart_plafform, Stewart platform, last modified on Aug. 2, 2014, printed from the Internet on Oct. 10, 2014, 3 pages.
Office Action dated Jul. 14, 2014 for U.S. Appl. No. 14/053,047.
Experimental verification of the dynamic model for a quarter size self-balancing wheelchair, Article by A. Blankespoor and R. Roemer, Published in American Control Conference, 2004. Proceedings of the 2004 (vol. 1), Conference Jun. 30, 2004-Jul. 2, 2004, 2 pages.

\* cited by examiner

SELF-BALANCING WHEELCHAIR

CROSS-REFERENCE TO RELATED APPLICATIONS

This patent application claims priority to and the benefit of U.S. Provisional Patent Application Ser. No. 62/373,011, filed on Aug. 10, 2016, U.S. Provisional Patent Application Ser. No. 62/405,572, filed on Oct. 7, 2016, and U.S. Provisional Patent Application Ser. No. 62/416,806, filed on Nov. 3, 2016, all of which are incorporated herein by reference in their entirety.

BACKGROUND

Wheelchairs are the primary mode of locomotion for millions of people around the world. While many people use manual wheelchairs, upper limb pain and injury is very common among these users. Moreover, many wheelchair users simply are not physically capable of manually powering a wheelchair. Motorized wheelchairs, which are powered by a motor and which a user can control via a joystick, have been introduced to aid users who are not physically able to manually power a wheelchair. Oftentimes, however, when powered wheelchairs accelerate and/or go up an incline or curb, the user may be jolted backward. Similarly, when powered wheelchairs decelerate and/or go down an incline or curb, the user may be jolted forward. For many users, such jolts can be a nuisance, uncomfortable, or even dangerous.

SUMMARY

The present disclosure describes systems for stabilizing a wheelchair. In particular, the wheelchair includes at least one caster arm configured to maintain contact with a surface underlying the wheelchair, the at least one caster arm including a force sensing system configured to measure a force exerted on the underlying surface by the at least one caster arm. An actuator is configured to adjust a position of the at least one caster arm based at least in part on the measured force.

In some examples, the caster arm is configured to maintain a predetermined amount of force on the underlying surface. The system may be motorized and raise the position of the at least one caster arm when the measured force is greater than the predetermined amount of force and lower the position of the caster arm when the measured force is less than the predetermined amount of force. The system can include a control system to control the actuator when the measured force deviates from the predetermined amount of force. The control system communicates with the force sensing system and the actuator using one of a wireless connection or a wired connection.

In accordance with this example, the system control could be used to keep the caster arm in contact with the ground until such a time that the system needs the caster arm to apply a stabilizing force. For instance, an orientation sensor can determine that the wheelchair is in danger of tipping rearward. In this example, one or more rear caster arms would increase the amount of force applied to the underlying surface in order to stabilizing the wheelchair. One or more front caster arms, however, may maintain contact with the ground but apply a de minimis amount of force to the underlying surface, to prevent destabilization of the wheelchair. The amount of force applied by the front caster arm is therefore enough to make contact with the ground, but not enough to change an orientation of the wheelchair. In this way, the rear caster arms are able to provide a force to the underlying surface, shifting the center of gravity and thereby preventing tipping. The front caster arms provide minimal, stabilizing forces, which reduces the time taken for the wheelchair stabilization system to engage (e.g., if the wheelchair suddenly jerked forward, the front caster arms would immediately respond with a stabilizing force to the underlying surface).

In some examples, the actuator includes a first end secured to the wheelchair and a second end secured to the at least one caster arm, the actuator pivots at least one of the first end or the second end in response to adjustment of the position of the at least one caster arm. The actuator can be a motorized system that includes a linear motor.

In some examples, the at least one caster arm includes a first and a second caster arm, the first caster arm located on a first side of the wheelchair and the second caster arm located on a second side of the wheelchair opposite the first side. The first caster arm can operate independently of the second caster arm. Also included is a mounting axis to which the first caster arm and the second caster arm are mounted. In some examples, the first caster arm and the second caster arm pivot about the mounting axis in response to adjustment from the system. A first mounting axis to which the first caster arm is secured to the wheelchair can also be included, and a second mounting axis to which the second caster arm is secured to the wheelchair.

In some examples, the system controls each caster arm to maintain contact with a surface underlying the wheelchair, using a force sensor configured to measure the force applied to the underlying surface from each caster arm of the plurality of caster arms. A plurality of actuators are configured to adjust a position of a respective caster arm of the plurality of caster arms based at least in part on a change in the measured force. The system includes a control system to control the plurality of actuators when the measured force deviates from a predetermined force. In examples, the control system is configured to activate the plurality of actuators to raise or lower the position of a first caster arm of the plurality of caster arms and raise or lower the position of a second caster arm of the plurality of caster arms based at least in part on the change in the measured force. In examples, the force sensor can include a force gauge, one or more accelerometers or one or more gyroscopes and/or one or more magnetometers. Additionally or alternatively, each caster arm of the plurality of caster arms can be configured to maintain a predetermined amount of force on the underlying surface.

In some disclosed examples, a system for stabilizing a wheelchair includes a plurality of caster arms configured to maintain a predetermined orientation of the wheelchair relative to a gravitational force. In examples, the system is configured to measure a change in orientation of the wheelchair via an orientation sensor. The orientation sensor measures a change in orientation with respect to a gravitational force at one or more locations on the wheelchair (e.g., a seat, a frame, etc.). Based on a measured change in orientation, the system can control one or more caster arms to adjust the force applied to the underlying surface in order to return the wheelchair to a desired orientation relative to gravity.

In some examples, the system includes a calibration system to determine the predetermined amount of force and the predetermined orientation. In examples, the predetermined orientation is determined relative to a seat of the wheelchair.

In other disclosed examples, a self-balancing wheelchair includes a frame, a pair of drive wheels connected to the frame, a seat connected to the frame and configured to move forward and backward with respect to the drive wheels, and a user interface. The user interface can be used to activate the drive wheels to move the wheelchair forward and backward, wherein when the drive wheels move forward the seat shifts forward to maintain the balance of the wheelchair and wherein when the drive wheels move backward, the seat shifts backward to maintain the balance of the wheelchair.

In some disclosed examples, a self-balancing wheelchair includes a frame, a pair of drive wheels connected to the frame, a seat connected to the frame and configured to move forward and backward with respect to the drive wheels, and a user interface. The user interface that can be used to move the seat forward and backward, wherein, in response to the seat moving forward, the drive wheels move forward to maintain the balance of the wheelchair, and, in response to the seat moving backward, the drive wheels move backward to maintain the balance of the wheelchair.

Certain aspects of the present technology provide a wheelchair having an embodiment of the presently disclosed stabilization system.

DETAILED DESCRIPTION

The presently disclosed technology relates generally to a stabilization system for a wheelchair. In particular, disclosed is a wheelchair employing one or more smart caster arms configured to stabilize a position and/or movement of the wheelchair, in response to one or more inputs from one or more sensors. Based on a measured and/or calculated change in one or more parameters, the position of one or more smart caster arms can be adjusted to stabilize the wheelchair. In some examples, each smart caster arm is adjusted independently of any other smart caster arm. In other examples, two or more smart caster arms (e.g., two opposing smart caster arms) are adjusted as a unit. For instance, the position of a front smart caster arm may be adjusted in an equal and opposite manner from a rear smart caster arm.

In disclosed examples, the one or more sensors include a force sensing system to measure changes in the force applied to an underlying surface at each smart caster arm. Based on the measured and/or a calculated change, the position of the smart caster arm can be adjusted to maintain a target amount of force at each smart caster relative to the underlying surface.

Additionally or alternatively, the one or more sensors include an orientation sensor. The orientation sensor can measure parameters that include, but are not limited to, linear velocities, angular velocities, linear accelerations, and angular accelerations. These parameters are quantified using a range of instruments, including but not limited to, gyroscopes, encoders, potentiometers, inertia measuring units, and multi-axis accelerometers. From these motion-based measurements, a change in an axis of the wheelchair (e.g., a horizontal or vertical orientation) can be recognized. Based on such a measured and/or calculated change, the position of the smart caster arms can be adjusted to stabilize the wheelchair, and, thus, a seated individual and/or other load therein.

Figure 1:
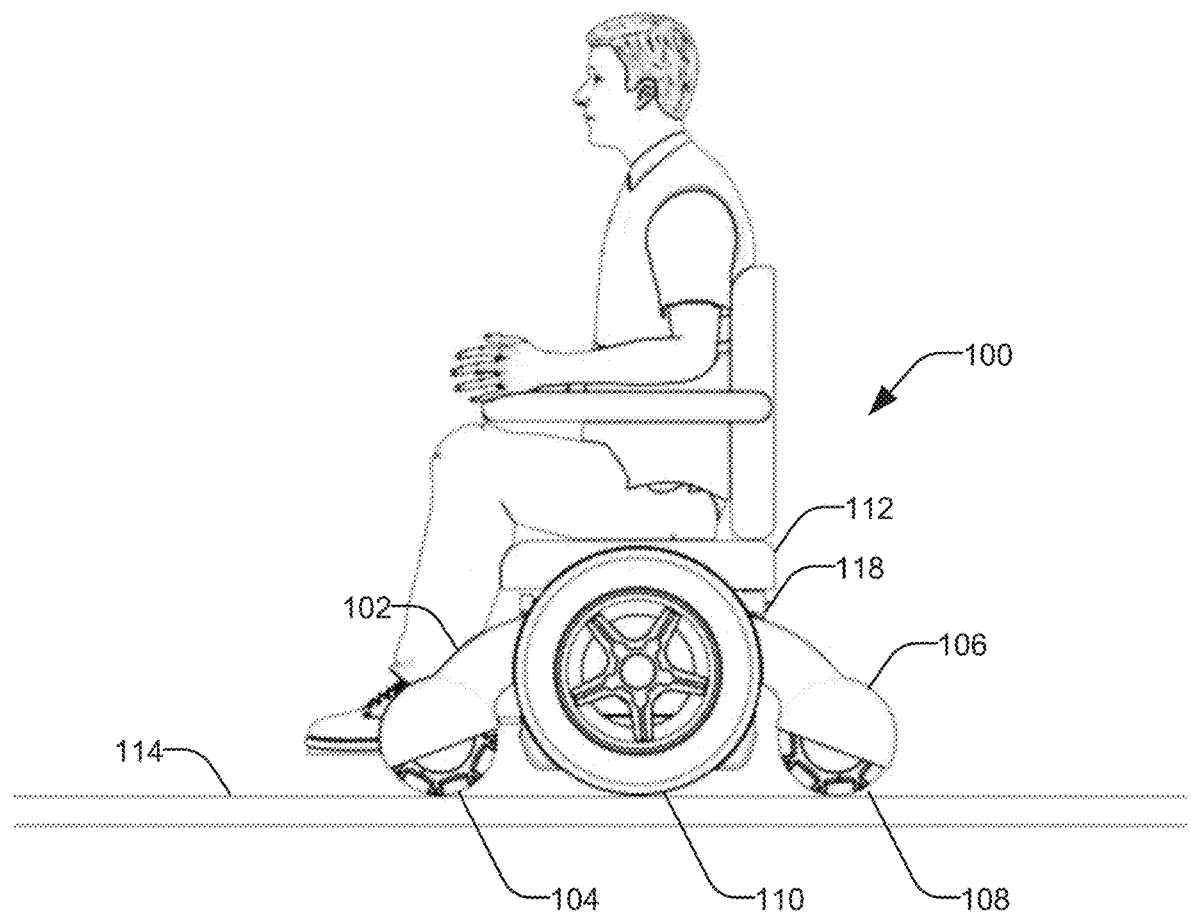
FIG. 1 illustrates an example of a motorized wheelchair including one or more smart caster arms, in accordance with the present disclosure.

FIG. 1 illustrates a wheelchair 100 that includes a frame or chassis 118. Two mid-wheel drive wheels 110 are attached on opposite sides of the frame 118. A seat or platform 112 is mounted to the frame 118 in which a person can sit. Each drive wheel 110 is connected to a drive motor (not shown). The motor drives the drive wheels 110 forward and backward, and can be used to steer the wheelchair in response to a user input (such as by independent rotation of different drive wheels). The motors are connected to a battery (not shown) which can be mounted on the frame 118 and controlled by a user interface such as a joystick that is located at or near armrests on the seat 112.

While the wheelchair 100 is in motion or is stationary, tipping of the wheelchair 100 and/or the seat 112, and, thus, the user, is prevented by "smart" caster arms 102, 106 that are located in front of and behind the drive wheels 110, with one of each mounted on each side of the wheelchair 100. Each caster arm 102, 106 includes a caster 104, 108, respectively, to make contact with an underlying surface 114. Each caster arm 102, 106 is also independently rotatably connected to the frame and independently controlled by a respective motor (see, e.g., FIGS. 3-5).

While the example of FIG. 1 shows two caster arms 102, 106, the wheelchair 100 could use fewer or more than two caster arms (e.g., four caster arms). By way of example only, wheelchair 100 has four caster arms—two front arms 102 on each side of the frame 118 and two rear arms 106 on each side of the frame 118. To stabilize the wheelchair 100, the smart caster arms 102, 106 are capable of applying a force onto the underlying surface 114 (i.e., the ground). Under typical operating conditions, the amount of force on the underlying surface 114 is minimal (e.g., less than 25 pounds per foot per arm) and generally uniform. Because the caster arms 102, 106 apply a constant force on the ground, each caster arm 102, 106 will simply follow the ground undulations without altering the balance of the wheelchair 100.

During operation of the wheelchair 100, the amount of constant force applied by each caster arm 102, 106 can be set at a predetermined level (e.g., 25 pounds per foot per arm). As the ground surface changes where the casters 104, 108 make contact, the amount of force applied by each caster arm 102, 106 can vary between an upper and lower level (e.g., +/−5 pounds per foot per arm). The amount of the constant force, as well as the variance, can maintain a default setting. Alternatively, the amount of constant force and/or the variance can be customized for a particular wheelchair and/or a particular user, such as by employing a user interface. In some examples, a calibration process can be executed, such as when the wheelchair 100 is preparing to move from a stored position, and/or when a new user is seated in the wheelchair 100. Running a calibration routine can aid in proper stabilization of the wheelchair 100, taking into account the weight of the seated user, relative height of the casters 104, 108 from the underlying surface 114, and other factors.

Figure 2A:
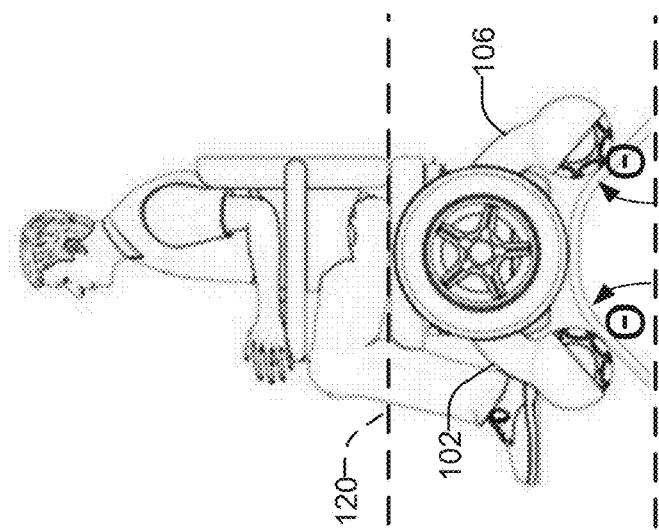
FIGS. 2A-2C illustrate stabilization operations performed by the one or more smart caster arms of FIG. 1.
Figure 2B:
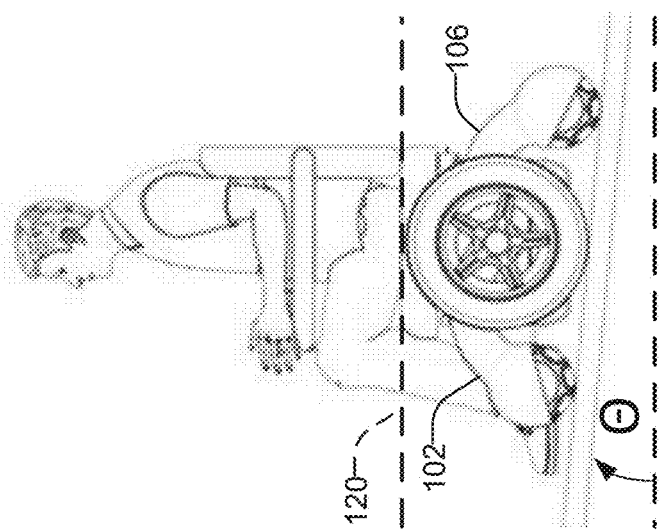
Figure 2C:
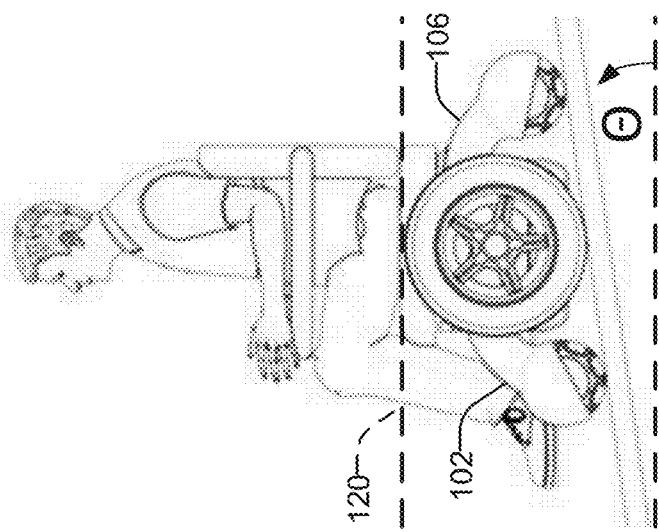

By use of the smart caster arms 102, 106 described with respect to FIG. 1, the self-balancing wheelchair 100 is configured to remain upright and level regardless of ground slope. As shown in FIGS. 2A to 2C, in the event of a significant disturbance to balance, the smart caster arms 102, 106 increases the force on the ground 114 to stabilize the wheelchair 100 and prevent it from tipping forward, rearward, or side-to-side. Disturbance to balance is identified when the wheelchair 100 tips from a predetermined orientation, such as a horizontal plane 120, beyond a set threshold angle theta ($\Theta$) (e.g., 5 degrees), which can be measured using an orientation sensing system (i.e., one or more orientation sensors), such as an inertial measurement unit (IMU), attached to the wheelchair frame 118 or seat 112.

As shown in FIG. 2A, if the orientation sensor signals that the wheelchair 100 is tipping forward, the front smart caster arm(s) 102 will respond by increasing their force applied to the ground to maintain the wheelchair 100 at a substantially level orientation so that the wheelchair 100 is quickly and smoothly returned to a substantially level orientation. In addition, in the example of FIG. 2A, the rearward smart caster arm(s) 106 decreases the amount of force applied to the ground in response to forward movement. Similarly, if the change in angle $\Theta$ determines the wheelchair 100 is set to tip rearward, as shown in FIG. 2B, the rear smart caster arm(s) 106 will apply an increased, corrective force to the ground. Conversely, the front smart caster arm(s) 102 decreases the force applied to the ground. As a result, the wheelchair 100 will remain upright, regardless of the slope of the ground.

As described with respect to FIGS. 2A and 2B, the smart caster arms 102, 106 can be configured to both maintain a constant, predetermined force to the underlying surface, as well as respond to a change in orientation of the wheelchair. In this manner, the caster arms 102, 106 provide improved stabilization capabilities, including increased response time in the event of an uneven surface or potential tipping of the wheelchair 100.

FIGS. 2A and 2B show the front caster arms 102 and the rear caster arms 106 increasing and/or decreasing the force applied to the ground by an equal and opposite amount, as the underlying surface is planar beneath the wheelchair 100. Advantageously, the front and rear smart caster arms 102, 106 are configured to operate independently of each other, and the change on the ground (such as a change in the ground pitch, an obstruction, a void, a change in ground composition, etc.) is determined at each individual caster arm 102, 106. Thus, as shown in FIG. 2C, where the surface is not planar, the smart caster arms 102, 106 can both increase the amount of force on the underlying surface, as the change in angle at a caster arm may be different from another.

Operation of the smart caster arms 102, 106 can be realized through a number of ways. In the examples illustrated in FIGS. 3A to 3D, the wheelchair 100 is shown with a drive wheel 110 removed and an outer portion of each caster arm 102, 106 removed, revealing the details of the caster arms 102, 106 and associated components. As shown, each caster arm 102, 106 is attached to the wheelchair 100 at a pivot point 116. Alternatively, the caster arms 102, 106 can be connected to the frame of the wheelchair 100 at separate pivot points. The position of each caster arm 102, 106 is adjusted by an actuator motor 124R and 124F, respectively. Each actuator motor (124R, 124F) is attached to the caster arm (102, 106) at a pivot point (126R, 126F) and attached to the wheelchair 100 frame at another pivot point (128R, 128F). The pivot points allow movement of the actuator motors 124R, 124F, which causes the caster arms 102, 106 to move relative to the frame of the wheelchair 100, increasing and/or decreasing the amount of force exerted on the underlying surface 114. In the example of FIGS. 3A to 3D, the actuator motors 124R, 124F change position of the respective caster arms 102, 106 by extending or retracting a piston (132R, 132F). A housing or cover 130 can protect the components from environmental contaminants and damage therefrom.

Figure 3A:
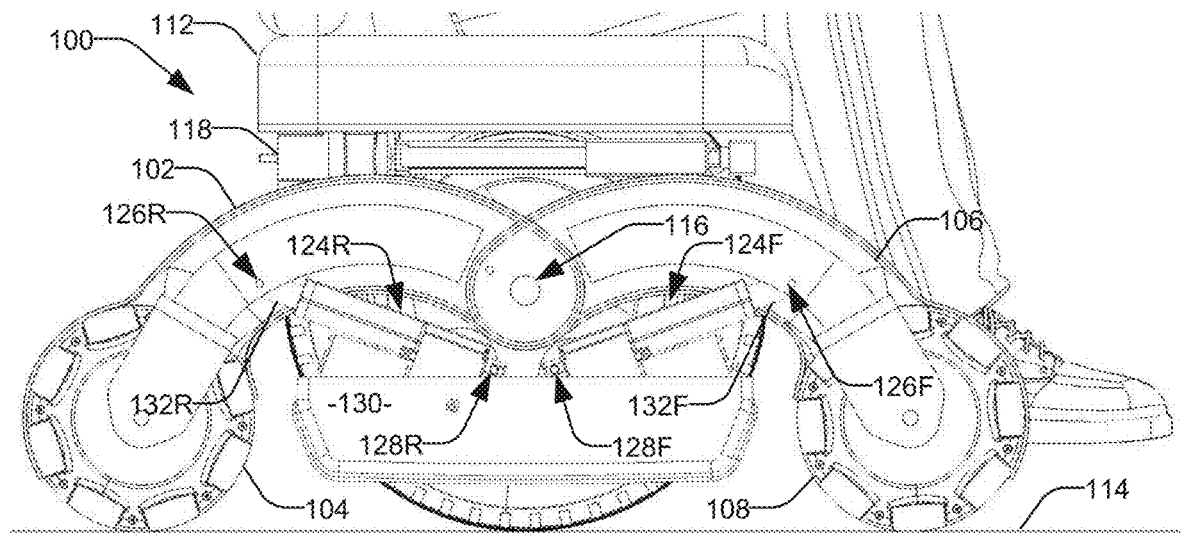
FIGS. 3A-3D illustrate an exploded view of the one or more smart caster arms of FIG. 1.
Figure 3B:
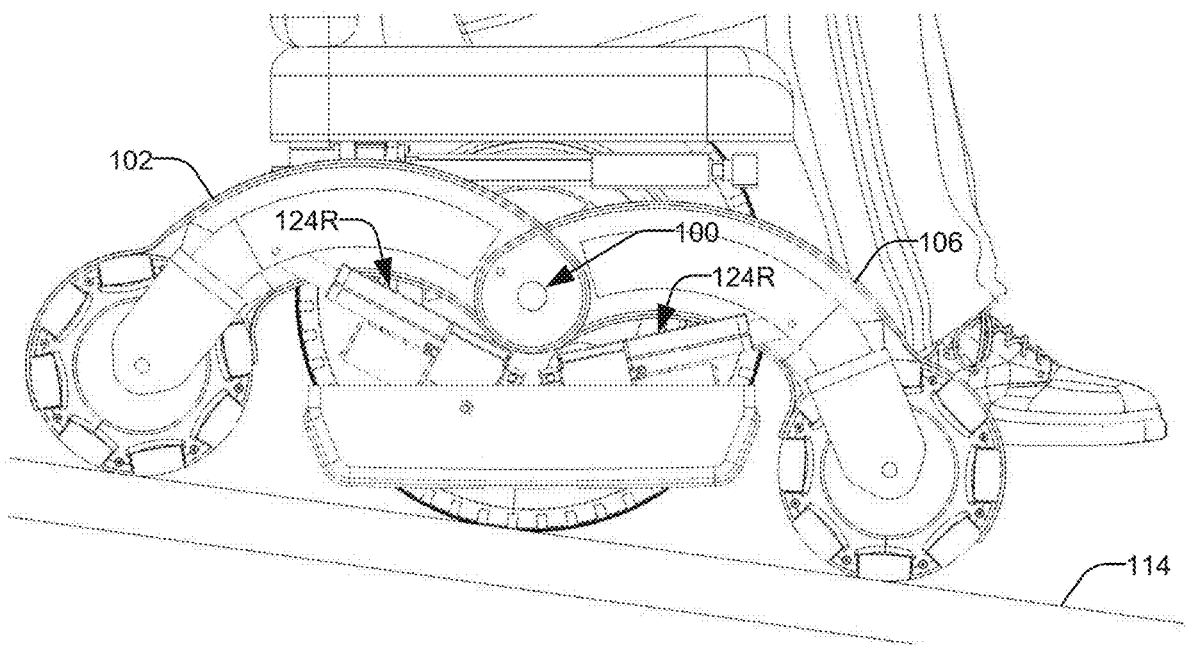
Figure 3C:
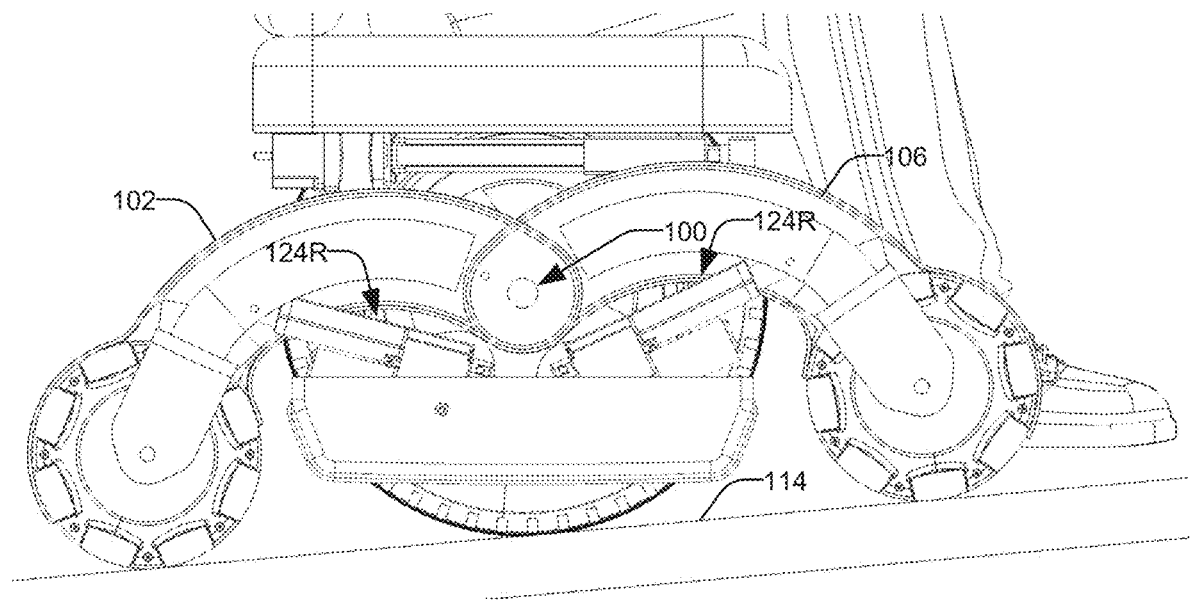
Figure 3D:
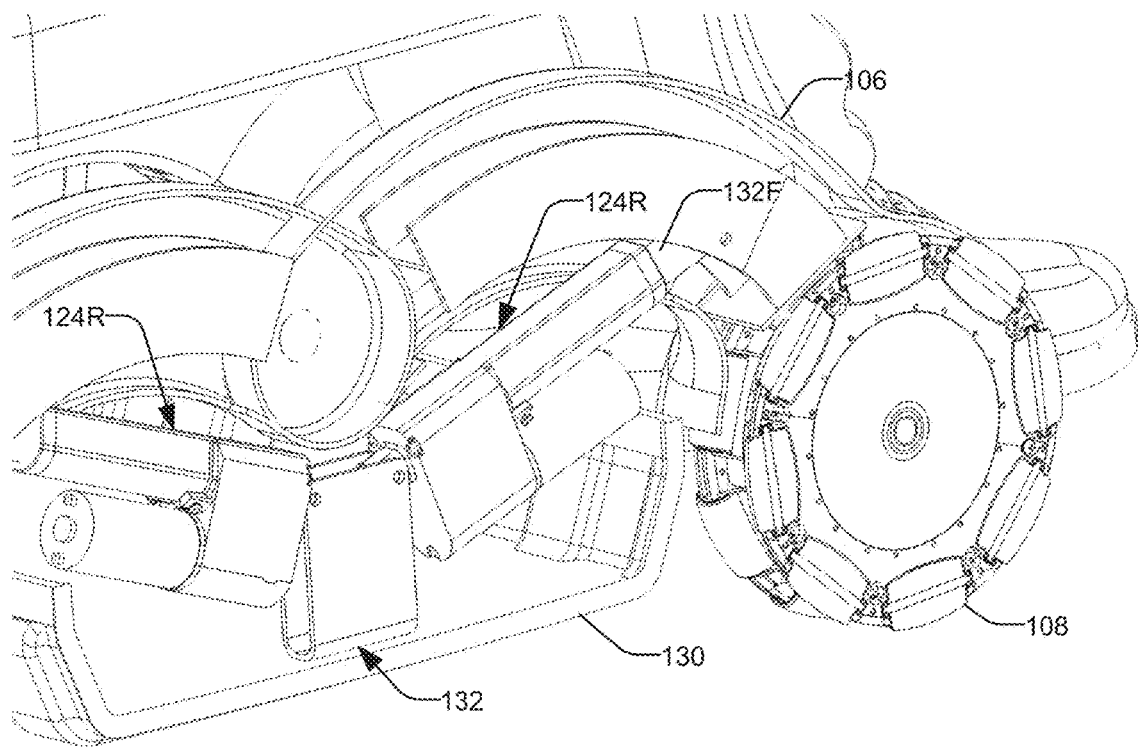

The amount of force applied against the underlying surface 114 by each caster 104, 108 is measured by one or more force sensors (not shown). By way of example only, the force sensor can be a force gauge (e.g., a mechanical or digital gauge, such as a spring scale, strain gauge, piezoelectric gauge, a load cell, etc.) and can be located on the caster 104, 108, such as at the axis of rotation or at the point of contact with the caster arm 102, 106. The measured force is compared against the desired amount of force (e.g., at a controller, not shown). If the measured force is outside an acceptable level, the actuator motors 124R, 124F adjust the pistons 132R, 132F to raise or lower the caster arm 102, 106 in order to maintain the predetermined amount of force on the ground and maintain stability of the wheelchair 100. Thus, FIGS. 3B and 3C show operation of the actuator motors 124R, 124F of the smart caster arms 102, 106 as the wheelchair 100 traverses a declining grade and an inclining grade, respectively similar to FIGS. 2A and 2B. FIG. 3D shows a perspective view of caster arm 106.

Figure 4A:
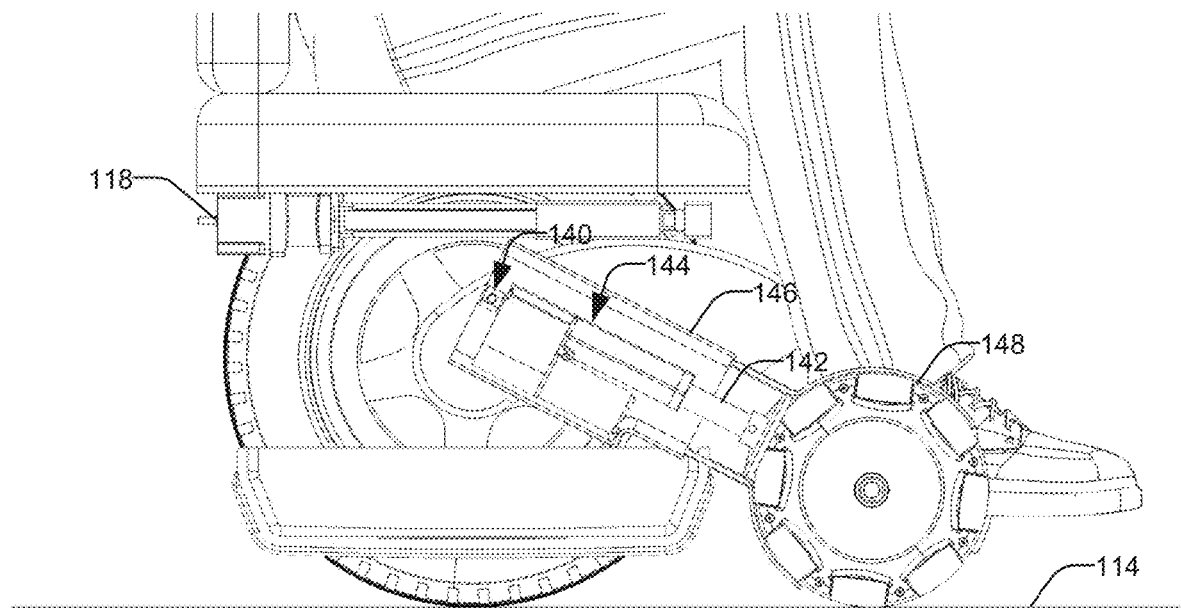
FIGS. 4A-4D illustrate another example smart caster arm in accordance with the present disclosure.
Figure 4B:
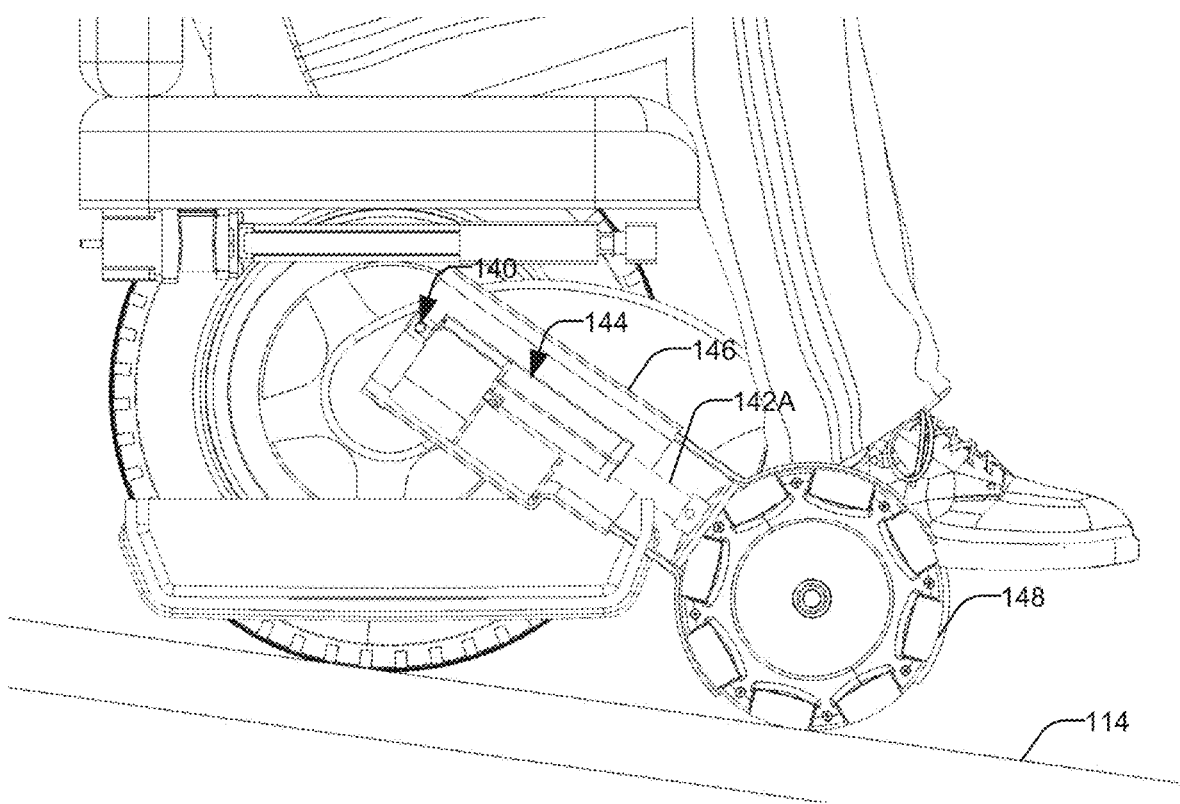
Figure 4C:
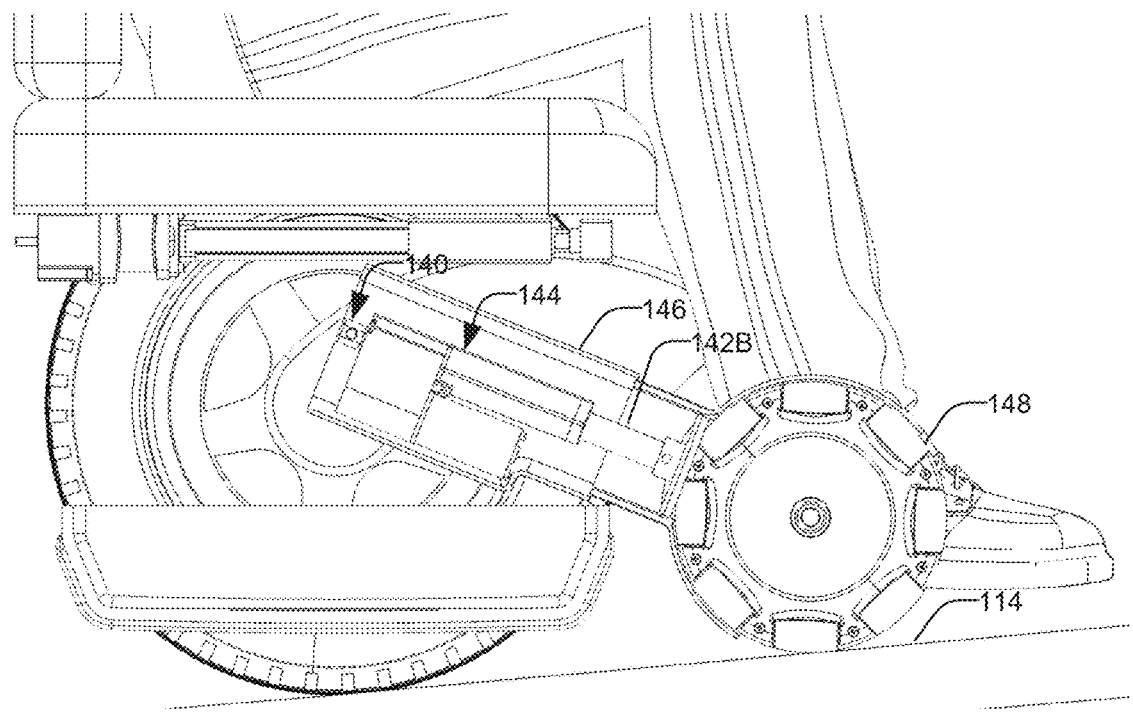
Figure 4D:
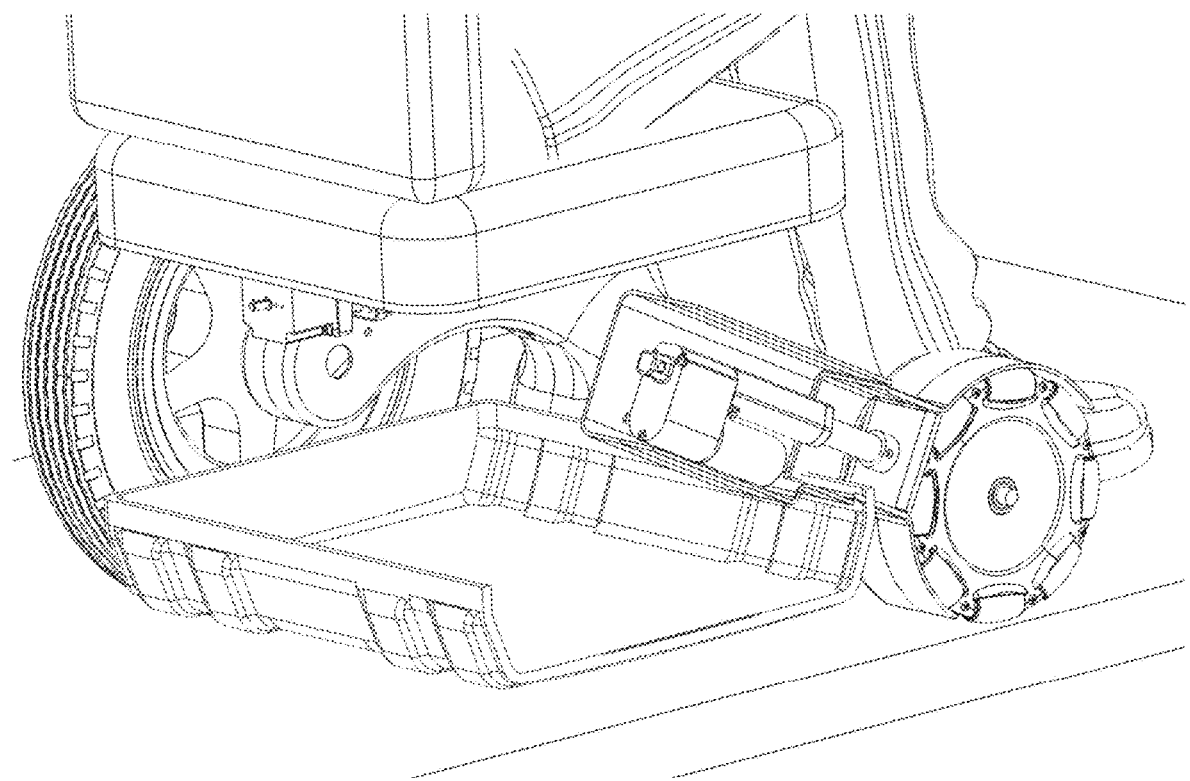

FIGS. 4A to 4D illustrate an alternative example smart caster arm 146 actuated by an associated linear motor 144. The force on the caster is measured using a force sensor, e.g., a load cell or strain gauge instrumentation (see, e.g., force sensor 163 of FIG. 7). In such a situation, the linear motor 144 will compensate for changes in the load cell and/or strain gauge to maintain the target applied force. In this example, the linear motor 144 includes a piston 142. The caster arm 146 operates in a manner similar to the caster arms 102, 106. However, the caster arm 146 may not share a common pivot point with another caster arm. As shown, the length of the caster arm 146 can extend and/or retract as the piston 142 extends and/or retracts in response to changes in the underlying surface as measured by the force sensor. Thus, the caster arm 146 length will increase as the wheelchair moves downhill (FIG. 4B), whereas the length of the caster arm 146 will decrease as the wheelchair moves uphill (FIG. 4C).

Additionally or alternatively, the caster arm 146 can pivot about a point 140, which may be fixed or floating relative to the frame of the wheelchair. Accordingly, the caster arm 146 can pivot about the point 140 during operation and/or extend its length in order to stabilize the wheelchair. Although only a single caster arm is illustrated in FIGS. 4A to 4D, one or more additional caster arms can be used in a rear and/or other side of the wheelchair.

In one example illustrated in FIGS. 5A to 5D, a front caster arm 156 is actuated by a stepper motor 154 through a torsional spring 155. In this example, the caster arm 156 pivots about an axis 152, such as a point secured to the wheelchair frame. Further, the force applied to the ground is related to the angular displacement of the torsional spring 155. The stepper motor 154 is controlled to maintain a target torsional spring displacement, thereby applying a generally constant force to the underlying surface by each caster arm. So, if the wheelchair encounters an uphill slope, a front caster arm 156 will articulate up, thereby increasing the torsional spring displacement, as shown by torsional spring 155A in FIG. 5C. The stepper motor 154 associated with the front caster arm 156 will then compensate by following that movement (i.e., rotating in a direction to release tension on the torsional spring 155), thereby maintaining the target torsional spring displacement. To increase the front caster arm force, for example on a downhill slope, the stepper motor 154 rotates to increase the torsional spring displacement (i.e., increasing the tension on the torsional spring 155B of FIG. 5D). The presence of a slope (i.e., a change in the orientation of the wheelchair relative to a gravitational force) can be determined by use of an orientation sensor communicating with a controller (not shown).

Figure 5B:
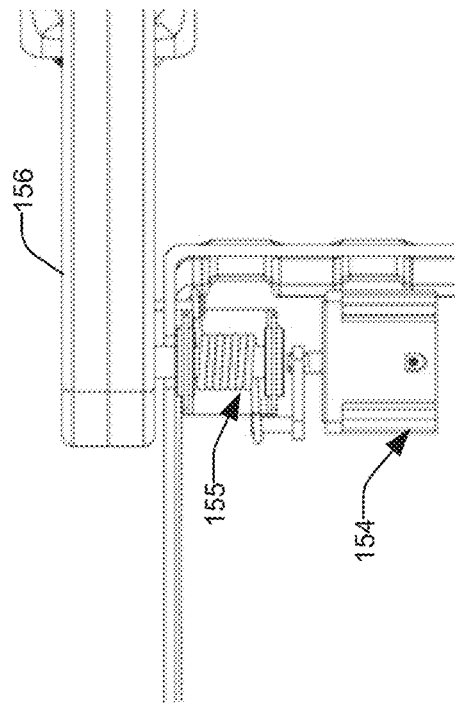
FIGS. 5A-5D illustrate yet another example smart caster arm in accordance with the present disclosure.
Figure 5D:
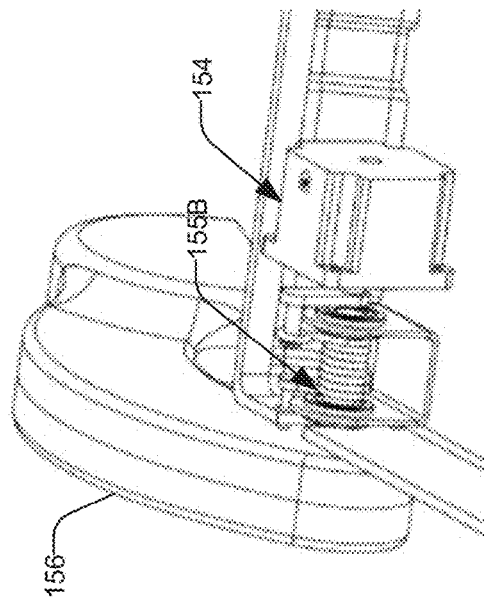
Figure 5A:
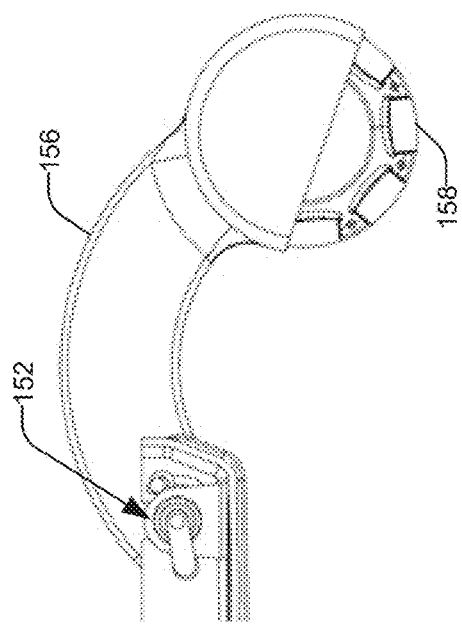
Figure 5C:
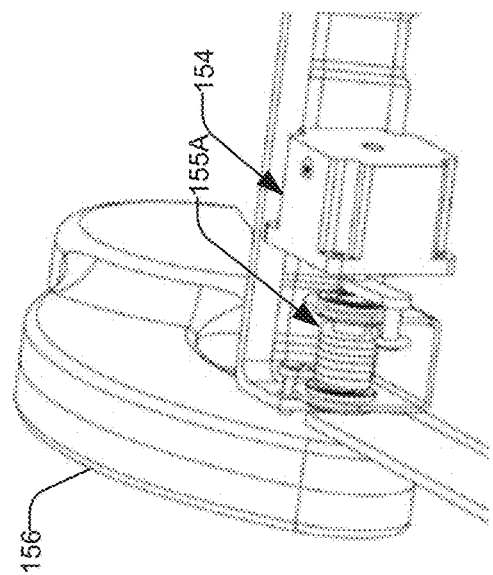

In the example of an uphill slope, and with respect to a rear caster arm (not shown), the rear caster arm will articulate downward, and the stepper motor 154 associated with the rear caster arm will compensate by increasing the tension on the torsional spring 155A. Conversely, on a downhill slope, the stepper motor 154 associated with a rear caster arm will rotate to release the tension in the torsional spring 155B, as shown in FIG. 5D.

In yet another example, one or both front caster arms and one or both rear caster arms can experience a downhill slope (such as that shown in FIGS. 2A and 2B). In such a situation, the stepper motor 154 can adjust the torsional spring displacement (e.g., by increasing or decreasing tension on the torsional spring 155 as necessary for each individual caster arm). In some examples, each caster arm can experience a different amount of torsional spring displacement (such as in a situation like that shown in FIG. 2C). Each associated stepper motor 154 will react accordingly to maintain a desired orientation of the wheelchair.

Moreover, the smart caster arms can be instructed to uniformly increase the force on the ground, such as when the wheelchair is at a stop. The benefit of this control is that it further increases the stability of wheelchair, allowing the user to transfer into and/or out of the wheelchair without it tipping. It also serves to stabilize the wheelchair when it is powered off and stored.

Figure 6A:
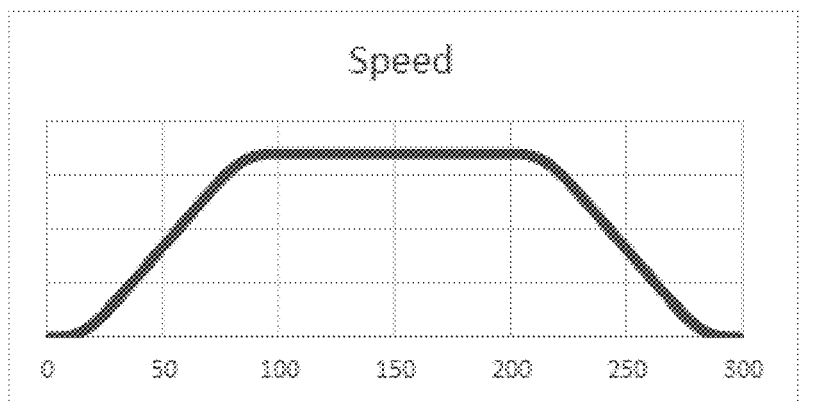
FIGS. 6A-6D show example graphical data representing operation and responses of a wheelchair in accordance with the present disclosure.
Figure 6B:
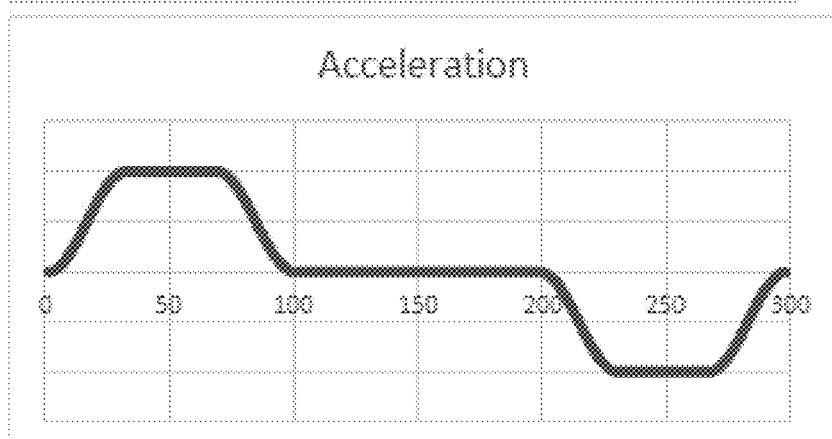
Figure 6C:
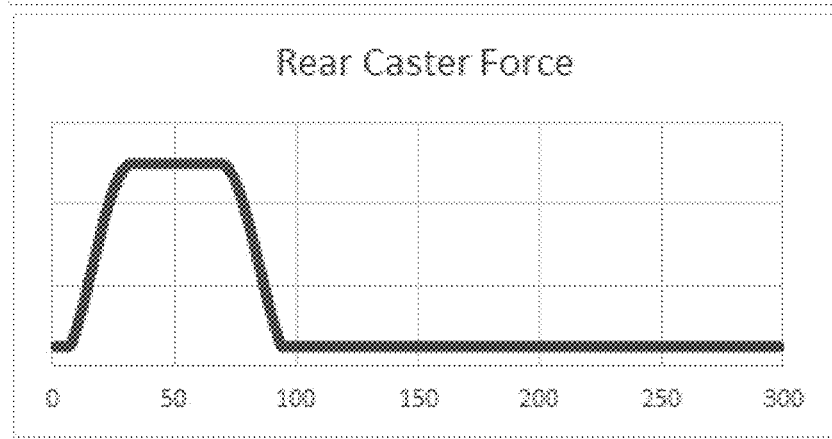
Figure 6D:
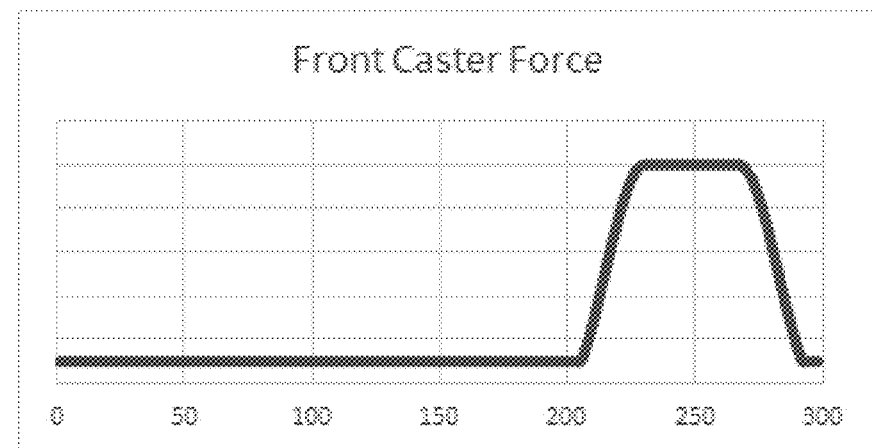

In some examples, the smart caster arms can also be instructed to counteract the effect of wheelchair acceleration and deceleration. FIGS. 6A to 6D represent graphical data related to movement of the wheelchair. In particular, FIG. 6A represents the speed of the wheelchair, FIG. 6B represents the acceleration of the wheelchair, FIG. 6C represents the force from the rear caster arm, and FIG. 6D represents the force from the front caster arm, as described herein.

As the wheelchair accelerates forward in response to a command from an operator (e.g., from a user interface such as a joystick), the rear caster arms will increase the force on the ground to counter the effect (i.e., backward shift of the seat) of the forward acceleration (e.g., at time 50). Similarly, as the wheelchair decelerates, the front caster arms will increase their force on the ground to counter the effect (i.e., forward shift of the seat) of the deceleration (e.g., at time 250). Wheelchair acceleration and deceleration can be predicted since they are directly proportional to drive motor throttle changes, which is controlled by joystick movement. Therefore, commands to the smart caster arms from the wheelchair controller can be based on and/or calculated from acceleration or deceleration commands provided to the motors by the operator via the user interface. As such, the smart caster arms can be actuated simultaneously (or nearly simultaneously) with the drive motors accelerating or decelerating the wheelchair.

Figure 7:
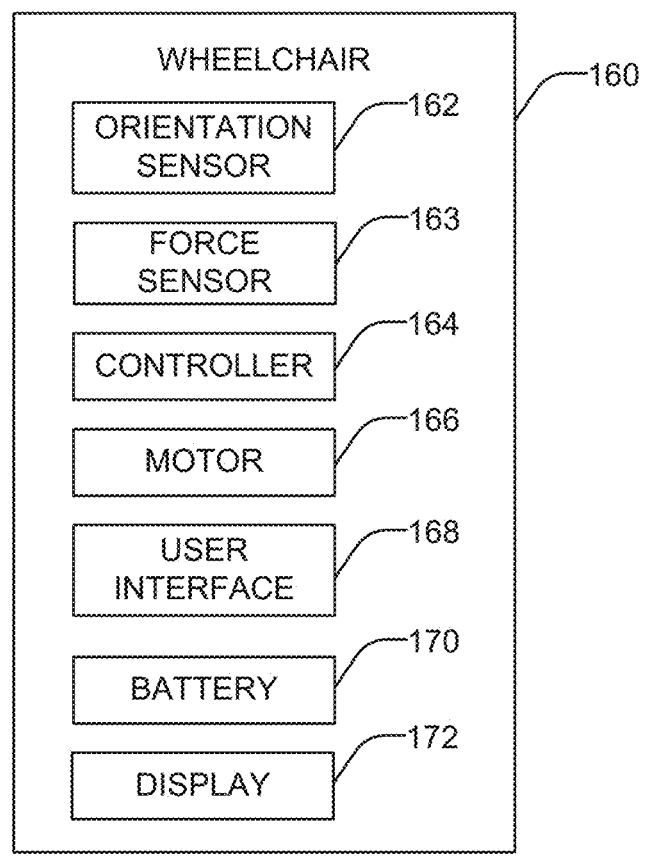
FIG. 7 shows a block diagram of an example control system for a wheelchair in accordance with the present disclosure.

FIG. 7 provides an example block diagram representing a wheelchair control system 160 to operate, for instance, the wheelchair 100 described with respect to FIGS. 1-6D. In this example, the system 160 includes one or more orientation sensors 162, one or more force sensors 163, controller 164, one or more motors 166, one or more user interfaces 168, one or more batteries 170, and one or more displays 172. The orientation sensors 162 are configured to detect the motion of the system 160 via one or more inertial measurement units (e.g., gyroscopes, accelerometers, magnetometers, etc.) and/or rotational position sensors (e.g., optical encoders, Hall Effect sensors, or reed switches, etc.) of the wheelchair.

One or more of the orientation sensors 162 may be configured to detect the angular motion of the wheelchair. And in some examples, multiple orientation sensors (e.g., a combination of sensors mounted at various locations on or influenced by the wheelchair) could be used to provide enhanced motion data. The orientation sensors 162 can be attached to the wheelchair, a portion of the wheelchair (e.g., the seat 112, the smart casters 102, 106, the casters 104, 108, etc.), to the seated individual, located remotely from the wheelchair, or any combination thereof.

The orientation sensor 162 may also be configured to communicate with the system. For example, in embodiments of the present technology, the orientation sensor 162 is configured to transmit information relating to the motion of the system using wireless communication technology. The type of wireless communication technology is not limited and may be selected from those generally known in the art, such as Wi-Fi, Bluetooth or other radio wave-based wireless, induction wireless, infrared wireless, ultra wideband (UWB), or the like. The orientation sensor 162 may also be configured to transmit information relating to the motion of the system 160 through a wired connection between the system 160 and the orientation sensor 162.

The orientation sensor 162 may be configured to detect, and in some examples measure, a variety of motions across numerous planes, for instance to capture movement in six degrees of freedom. The orientation sensor 162 may include one or more accelerometers and one or more gyroscopes, and/or one or more magnetometers. For instance, the orientation sensor 162 may include an inertial measurement unit (IMU). In some examples, the IMU may be a three-axis IMU, which comprises three accelerometers, three gyroscopes, and optionally three magnetometers. The orientation sensor 162 may also include an integrated power source, or may be connected to battery 170.

A force sensor 163 may be configured to measure an amount of force applied against an underlying surface by each caster. As described herein, the force sensor 163 can be a force gauge (e.g., a mechanical or digital gauge, such as a spring scale, strain gauge, piezoelectric gauge, a load cell, etc.) and can be located on each caster. The measured force is compared against the desired amount of force (e.g., at a controller 164), information which can be used to adjust the pistons of a respective caster arm to maintain the predetermined amount of force on the ground and maintain stability of the wheelchair 100.

In some example systems, the acceleration and deceleration of the wheelchair may be used to determine when a response at one or more caster arms is warranted. For example, determination of the linear acceleration of the wheelchair could be accomplished by frequently sampling the rotational position of the drive wheel 110, differentiating discrete samples to derive the rotational speed, and then differentiating rotational speed values to determine the rotational acceleration of the wheel (the linear acceleration of the wheelchair being directly related to the rotational acceleration of the drive wheel 110).

In some examples, the battery 170 or an extra battery pack may be configured to slide under the seat 112, such as housed in cover 130, and connect, via a cord or wire, to the motors (e.g., one or more of motors 124R, 124F, 144, 154, etc.).

In some examples, the system 160 can be configured to be programmable, such that the system 160 could be tailored to a specific individual. In this way, the system 160 may be configured to most accurately register the orientation sensor 162 data that is indicative of movement of the wheelchair and the effect on the seated individual. The system may also comprise a "smart" system, i.e., be configured to use data from the system 160 and the orientation sensor 162 in order to "learn" which sensor data is indicative of a particular user (i.e., user posture, weight, speed tolerance, etc.).

In some examples, information from the orientation sensor 162 may result in one or more user notification components presented, for instance, on display 172. The one or more user notification components may be configured to notify a user when the wheelchair is in movement, when a smart caster has been activated, etc. The one or more user notification components may also notify a user when a battery is low. The one or more user notification components provided on display 172 may comprise a light indicator for providing a visual indication, a speaker for providing an auditory indication, a vibrating indicator for providing a physical indication, or any combination thereof.

Figure 8:
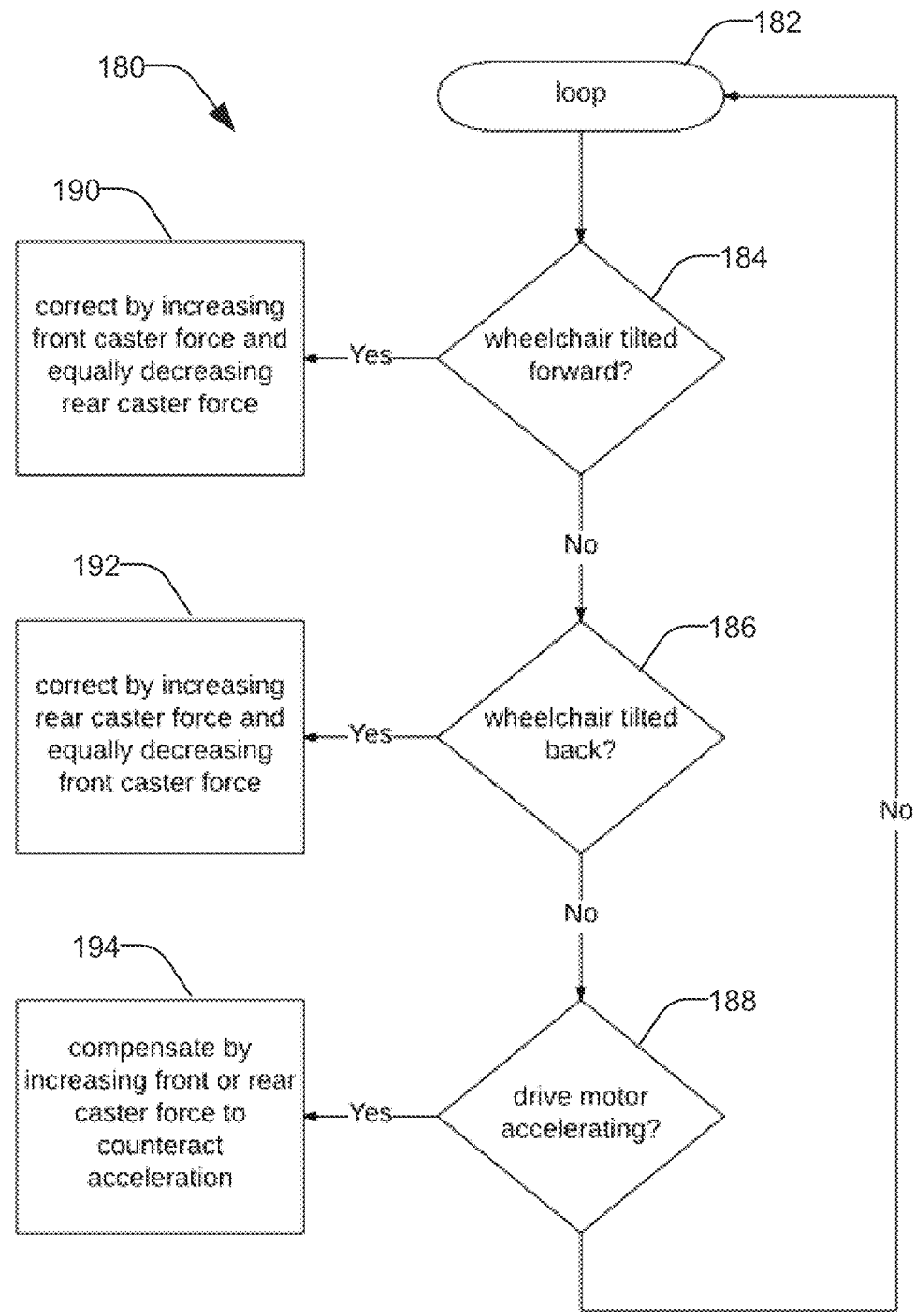
FIG. 8 shows an example algorithm to stabilize a wheelchair in accordance with examples disclosed herein.

FIG. 8 illustrates an example control algorithm 180 for the smart caster arm system shown in FIGS. 1-6D. The algorithm 180 relates to monitoring the angle of the wheelchair base or frame and/or any drive wheel acceleration, and then varying the smart caster arm force to achieve stability as described herein with reference to FIGS. 1-6D. At block 182, using a microcontroller (e.g., the controller 164 of FIG. 7), this algorithm can be implemented at a high loop frequency to result in smooth, consistent upright wheelchair orientation. The actuator motors that generate the smart caster arm force can be controlled, by way of example, using a PID algorithm to minimize the degree to which the wheelchair orientation deviates from a predetermined orientation (e.g., horizontal plane, vertical plane, etc.). In other examples, software, hardware or a combination of software and hardware can intelligently govern the application of one or more algorithms to control the caster arms.

In the example of FIG. 8, at block 184 the controller monitors the angle of tilt of the wheelchair by using, for example, an accelerometer, gyroscope, force balance mechanism, or other suitable sensor. In response to a forward tilt, the force applied to the underlying surface by the front caster arms is increased at block 190, whereas the force applied by the rear caster arms is equal to and opposite that of the front caster arms. If, as shown in block 186, the wheelchair experiences a backward tilt, the force applied by the front and back caster arms is reversed in block 192. In a situation where the wheelchair experiences a lateral tilt (i.e., side to side angle), each caster arm can respond independently of the other caster arms in order to compensate for such movement. For example, if the wheelchair is tilting to the left, the left caster arms may increase the amount of force applied to the underlying surface. Further, if the wheelchair experiences a tilt in multiple angles (i.e., to the front as well as to the left side), each caster arm will react accordingly to apply a stabilizing force to the underlying surface at each respective location.

In yet another example, when a user accelerates the vehicle by activating the drive motor in block 188, the caster arms can respond according to the direction and magnitude of the acceleration in block 194. For instance, if the drive motor accelerates forward, the rear caster arms will increase the amount of force applied to the underlying surface. In response to a rearward force, the front caster arms increase the force applied to the underlying surface, thereby improving the stability of the user during rearward movement.

FIGS. 9A-9C and 10 illustrate another example of a powered wheelchair. The wheelchair 300 is a two wheel, self-balancing powered wheelchair. Two-wheel, self-balancing vehicles, such as the Segway, examples of which are shown in U.S. Pat. No. 6,302,230 (which is hereby incorporated by reference), are used by the able-bodied to move around. Such self-balancing vehicles provide stability for the vehicle and user by balancing on the two wheels, during both operation and when in a stopped position. In an example, the self-balancing operation causes rotation of the left and the right wheels, such as in opposite senses of rotation at a rate sufficient to prevent tipping of the vehicle. In some examples, forward and reverse motion of the vehicle can be initiated by the leaning forward or backward of the seated individual, the lean being measured by one or more sensors which instruct a vehicle drive system to move accordingly. Such two-wheel, self-balancing vehicles utilize lean as a means to operate the vehicle because leaning counteracts the tipping tendency created during acceleration of the vehicle. If the operator were standing upright when the vehicle accelerated forward, he or she would tend to fall over backwards. By leaning forward, the operator's weight is shifted forward of the wheels and it counteracts the tendency to tip over backwards when the vehicle accelerates forward.

Figure 9A:
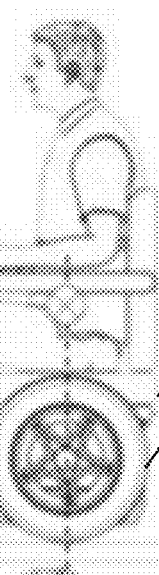
FIGS. 9A-9C show operation of a wheelchair stabilization system and a user response in accordance with the present disclosure.
Figure 9B:
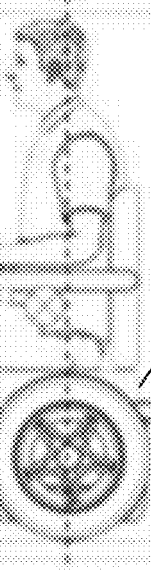
Figure 9C:
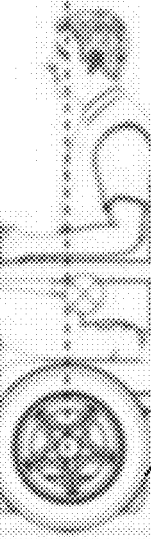

Movement of the two-wheel, self-balancing wheelchair 300 shown in FIGS. 9A-9D is controlled through the use of a user interface, such as a joystick. Alternatively or additionally, in some examples, the wheelchair 300 may be controlled by leaning. By pushing the joystick forward, the wheelchair 300 will drive forward and, by pulling back on the joystick, the wheelchair 300 drives in reverse. Turning is accomplished by pushing the joystick to the left or right. In this example, the user remains upright in the seat 310 during driving movement. The wheelchair 300 maintains balance during acceleration by shifting the seat 310, and, thus, the user's weight, forward and backward relative to the drive wheels 320, as shown in FIGS. 9A to 9C, to maintain the center of gravity of the user and seat over the drive wheels. In this example, the user pushes the joystick forward, the seat 310 shifts forward. If the user pulls back on the joystick, the seat shifts 310 backwards. In some examples, the user's weight is shifted at the base of the seat 310, for instance, via a linear actuator and track system. Alternatively, other methods of linearly moving the seat 310 backward and forward with respect to the drive wheels 320 and frame of the wheelchair 300 can be employed.

Figure 10:
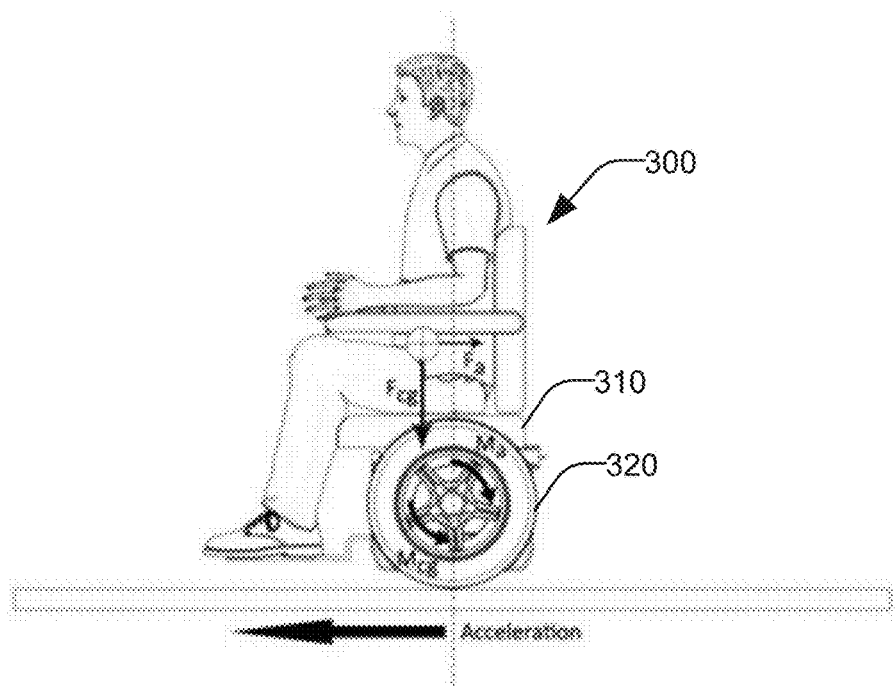
FIG. 10 show operation of a wheelchair stabilization system and a user response in accordance with the present disclosure.

By shifting the seat 310, the wheelchair 300 positions the user's weight to counteract the effects of acceleration. As shown in FIG. 10, when the wheelchair 300 accelerates forward (Fa), it creates a moment (Ma) that tends to tip the user backwards. To counteract this, the user's weight is shifted forward (Fcg) by shifting the seat 310 forward. This shift in weight creates a moment (Mcg) that tends to tip the user forward. By coordinating the amount of weight shift with the acceleration of the wheelchair 300, the system can maintain its balance, as shown in FIGS. 9A to 9C. For example, FIG. 9B shows a reaction to a forward acceleration, in which the seat 310 shifts the center of gravity forward in response. Similarly, FIG. 9C shows the seat 310 shifting the center of gravity rearward as the wheelchair 300 accelerates backward.

Figures 11A, 11B, 11C:
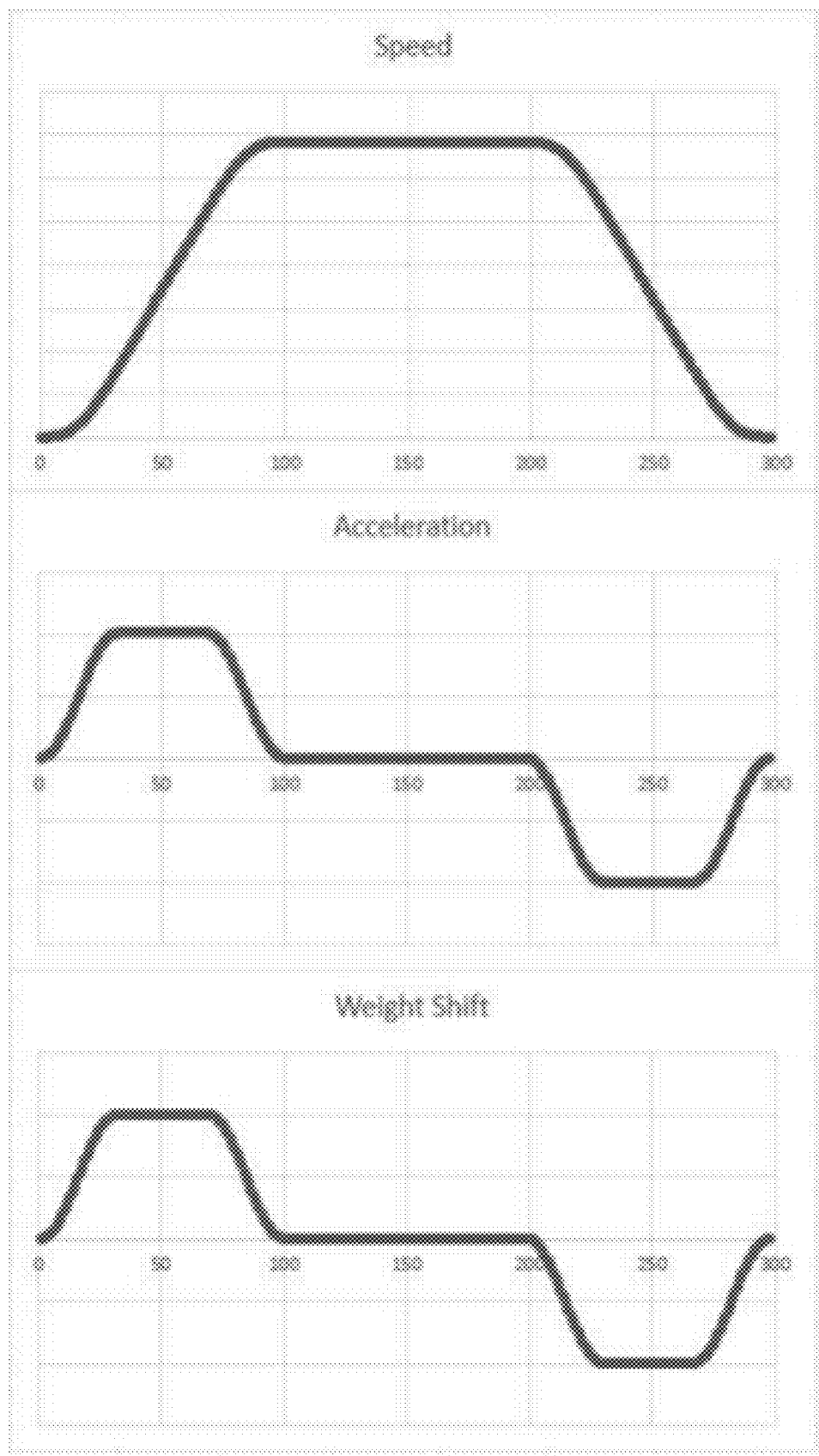
FIGS. 11A-11C show additional example graphical data representing operation and responses of a wheelchair in accordance with the present disclosure.

Balancing these effects is accomplished by moving the seat 310 forward and backward in proportion to the acceleration of the wheelchair 300, as shown in FIGS. 11A to 11C. Both the seat position (FIG. 11C) and the motor acceleration (FIG. 11B) are controlled by the control logic of the wheelchair 300, such as by controller 326, as provided in FIG. 12. Advantageously, the rate at which the seat 310 can be shifted limits the acceleration that can be applied to the motors (not shown) that drive the wheels 320. The proportional relationship between motor acceleration and required weight shift can be optimized for individual users through a calibration procedure.

In other examples of the wheelchair shown in FIGS. 9A-C and 10, leaning or a change in the position of the user (such as an inadvertent or minor shift in weight) can be countered by the wheelchair 300 to maintain balance. For example, as described herein, in addition or as an alternative to using a joystick, a seated individual may control movement of the wheelchair 300 by leaning, such as forward and backward. In another example, upsetting the balance of wheelchair 300 by a minor shift in the user's weight may be corrected by shifting the seat 310, opposite rotation of the drive wheels 320, or a combination of both. In another example, when the user relies on the joystick to control movement of the wheelchair 300 (e.g., due to physical limitations), the self-balancing wheelchair 300 may be configured to shift the seat 310 in response to the user's lean or shift in weight, as opposed to driving the wheelchair 300.

In another alternative example, the joystick of the self-balancing wheelchair 300 can be used to move the seat 310 forward and backward, instead of causing the wheels 320 to move backward and forward. The shifting of the seat 310 forward in turn can approximate a "lean" forward and cause the wheels 320 to move the self-balancing wheelchair 300 forward and the shifting of the seat 310 backward can approximate a "lean" backward cause the wheels 320 to move the self-balancing wheelchair 300 backward.

In some examples, a two-wheel, self-balancing wheelchair, such as wheelchair 300 described with respect to FIGS. 9-11, can additionally employ the smart caster arm technology described in FIGS. 1-8. In this example, a change in orientation of the self-balancing wheelchair (e.g., a tilt or lean, etc.) would result in a rotational movement in the wheels of the wheelchair to maintain the balance of the wheelchair, as described in FIGS. 9-11. In addition to the self-balancing response, the smart caster arms can adjust to stabilize the wheelchair, by maintaining the predetermined amount of force on the ground and/or increasing/decreasing the force applied to the ground in response to a change in the orientation sensor, as described in FIGS. 1-8. Additionally or alternatively, the seat of the wheelchair can shift to stabilize a seated user, as explained with respect to FIGS. 9-11. Furthermore, in this example, the self-balancing capabilities of the two-wheel system could be used to maintain balance when (1) the wheelchair is generally stationary but the user may be moving or shifting his or her weight in the wheelchair, and/or (2) the wheelchair is going slowly and/or over short distances while the smart caster technology could be used to maintain balance when the wheelchair is driving over a certain speed and/or distance.

Advantageously, a wheelchair employing the self-balancing technology, the caster arms, and/or shifted seat is capable of maintaining stability in a manner not previously conceived. In particular, maintaining a precisely measured center of gravity is not required to maintain the comfort and stability of the user, such as having the center of gravity of the individual or payload directly aligned with the centerline of the drive wheels.

Figure 12:
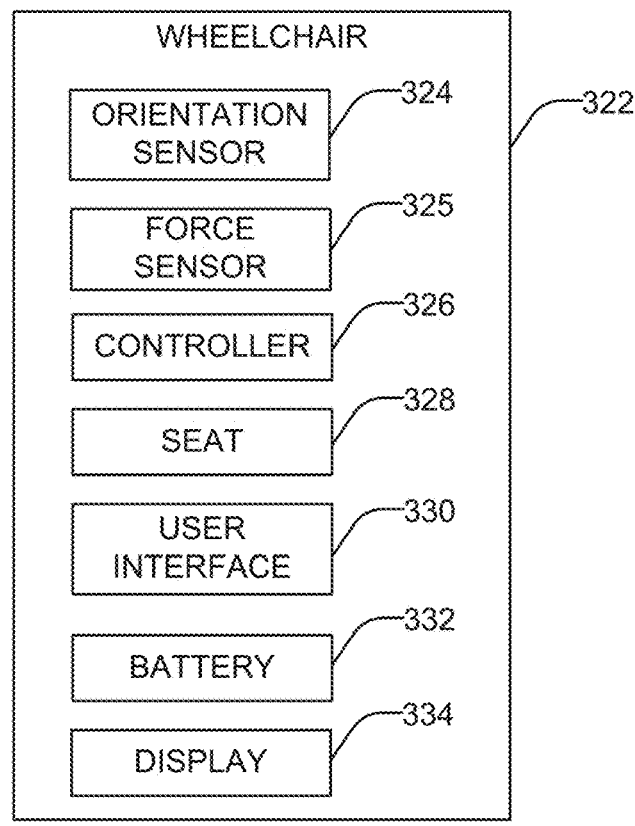
FIG. 12 shows a block diagram of an example control system for a wheelchair in accordance with the examples described with respect to FIGS. 9-10.

FIG. 12 provides an example block diagram representing a wheelchair control system 322 to operate, for instance, the wheelchair 300 described with respect to FIGS. 9-10. In this example, the system 322 includes one or more orientation sensors 324, one or more force sensors 325, a controller 326, a motorized seat 328 (e.g., seat 310), one or more user interfaces 330 (e.g., a joystick), one or more batteries 332, and one or more displays 334. The orientation sensors 324 are configured to detect the motion of the system 322 via one or more inertial measurement units (e.g., gyroscopes, accelerometers, magnetometers, etc.) and/or rotational position sensors (e.g., optical encoders, Hall Effect sensors, or reed switches, etc.) of the wheelchair 300.

One or more of the orientation sensors 324 may be configured to detect acceleration of the wheelchair. And in some examples, multiple orientation sensors 324 (e.g., a combination of orientation sensors mounted at various locations on or influenced by the wheelchair) could be used to provide enhanced motion data. The orientation sensors 324 can be attached to the wheelchair, a portion of the wheelchair 300 (e.g., the seat 310, the wheelchair frame, etc.), to the seated individual, located remotely from the wheelchair 300, or any combination thereof.

The orientation sensor 324 may also be configured to communicate with the system 322. For example, in embodiments of the present technology, the orientation sensor 324 is configured to transmit information relating to the motion of the system 322 using wireless communication technology. The type of wireless communication technology is not limited and may be selected from those generally known in the art, such as Wi-Fi, Bluetooth or other radio wave-based wireless, induction wireless, infrared wireless, ultra-wideband (UWB), or the like. The orientation sensor 324 may also be configured to transmit information relating to the motion of the system 322 through a wired connection between the system 322 and the orientation sensor 324.

The orientation sensor 324 may include one or more accelerometers and one or more gyroscopes, one or more magnetometers, and/or an inertial measurement unit (IMU) configured to measure an acceleration of the wheelchair 300. In some examples, the orientation sensor 324 may also include an integrated power source, or may be connected to battery 332.

A force sensor 325 may be configured to measure an amount of force applied against an underlying surface by each caster. As described herein, the force sensor 325 can be a force gauge (e.g., a mechanical or digital gauge, such as a spring scale, strain gauge, piezoelectric gauge, a load cell, etc.) and can be located on each caster. The measured force is compared against the desired amount of force (e.g., at a controller 326), information which can be used to adjust the pistons of a respective caster arm to maintain the predetermined amount of force on the ground and maintain stability of the wheelchair 322.

In some example systems, the acceleration and deceleration of the wheelchair may be used to determine when a response at the seat 328 is warranted. For example, determination of the linear acceleration of the wheelchair 300 could be accomplished by frequently sampling the linear acceleration of the wheelchair 300 and/or the rotational acceleration of the drive wheel 320. In some examples, the battery 332 or an extra battery pack may be configured to slide under the seat 310, and connect, via a cord or wire, to the motors shifting the seat 310.

In some examples, the system 322 can be configured to be programmable, such that the system 322 could be tailored to a specific individual. In this way, the system 322 may be configured to most accurately register the orientation sensor 324 data that is indicative of movement of the wheelchair and the effect on the seated individual. The system may also comprise a "smart" system, i.e., be configured to use data from the system 322 and the orientation sensor 324 in order to "learn" which sensor data is indicative of a particular user (i.e., user posture, weight, speed tolerance, etc.).

In some examples, information from the orientation sensor 324 may result in one or more user notification components presented, for instance, on display 334. The one or more user notification components may be configured to notify a user when the wheelchair is in movement, when a smart caster has been activated, etc. The one or more user notification components may also notify a user when a battery is low. The one or more user notification components provided on display 334 may comprise a light indicator for providing a visual indication, a speaker for providing an auditory indication, a vibrating indicator for providing a physical indication, or any combination thereof.

Figure 13:
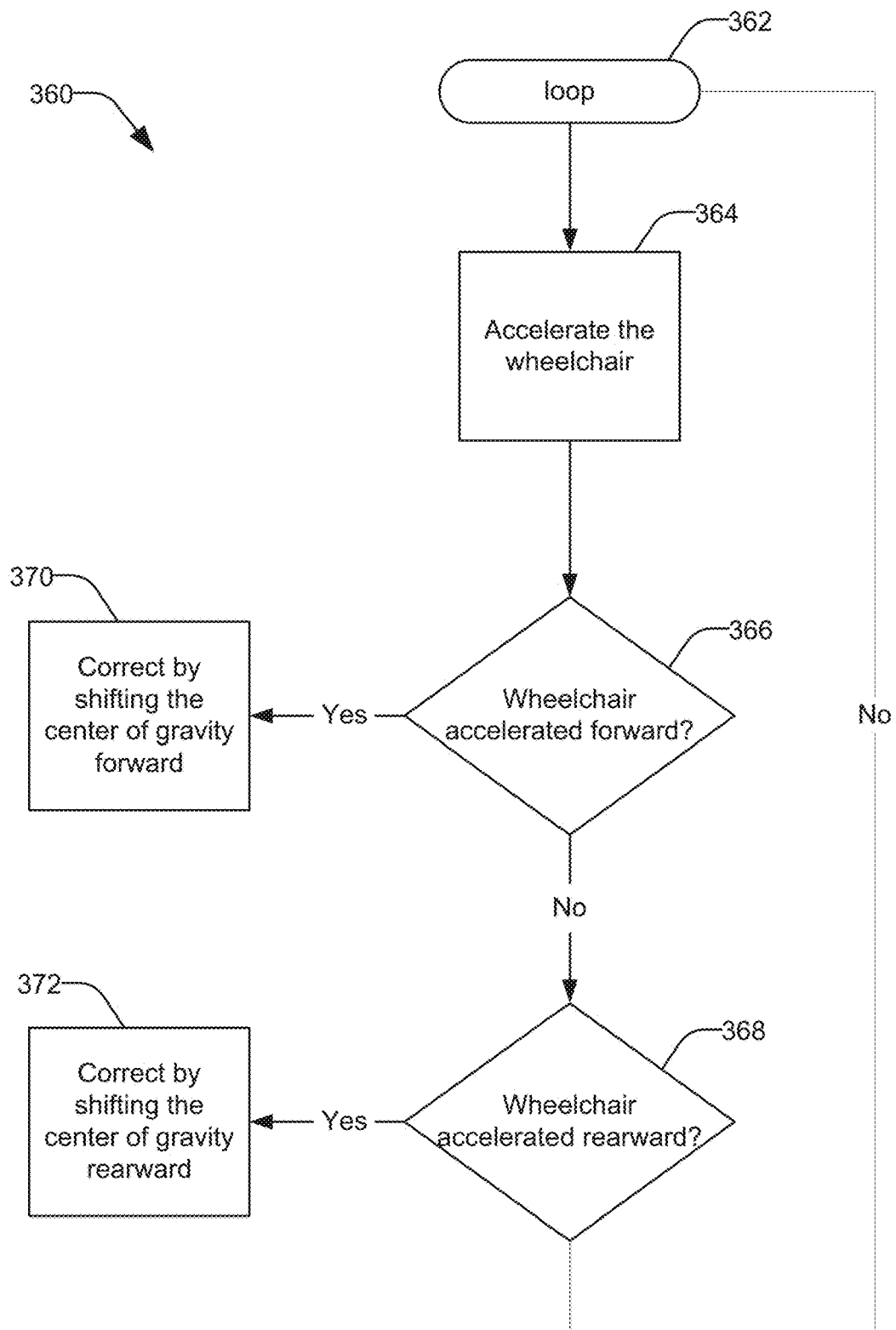
FIG. 13 shows an example algorithm to balance a wheelchair, in accordance with the examples described with respect to FIGS. 9-10.

FIG. 13 illustrates an example control algorithm 360 for the self-balancing powered wheelchair 300 shown in FIGS. 9-10. The algorithm 360 relates to monitoring the wheelchair 300 acceleration, and then varying the position of the seat 310 to achieve stability as described herein with reference to FIGS. 9-10. At block 362, using a microcontroller (e.g., the controller 362 of FIG. 12), this algorithm can be implemented at a high loop frequency to result in smooth, consistent upright wheelchair orientation. The motors that initiate movement of the seat 310 in response to acceleration of the wheelchair 300 can be controlled, by way of example, using a PID algorithm to minimize the degree to which the wheelchair orientation deviates from a predetermined orientation (e.g., horizontal plane, vertical plane, etc.). In other examples, software, hardware or a combination of software and hardware can intelligently govern the application of one or more algorithms to control the caster arms.

In the example of FIG. 13, at block 364 the controller monitors the acceleration of the wheelchair 300 by using, for example, an accelerometer, gyroscope, force balance mechanism, or other suitable orientation sensor. In response to a forward acceleration in block 366, the center of gravity is shifted forward by a forward movement of the seat 310 at block 370. If, as shown in block 368, the wheelchair 300 accelerates to the rear, the center of gravity is shifted rearward by movement of the seat 310 to the rear, as provided in block 372.

The examples described above provide a wheelchair stabilization system that helps reduce the jolting and/or tipping of a user caused by movement of the wheelchair. In other words, as the wheelchair experiences a change in position, orientation, acceleration, etc., the stabilization systems described herein (e.g., smart caster arms, self-balancing wheels, shifting seat, etc.) counteract the effects of the change on the wheelchair's user. Accordingly, the wheelchair stabilization system provides comfort, stability, and control to the user that is not available in current systems.

Although the above description implies an order of analysis, operation of the system is not limited to any particular order of analysis. Rather, motion data, acceleration data, or any other variable may be analyzed at the same time or any other time during operation of the system.

The present technology has now been described in such full, clear, concise and exact terms as to enable any person skilled in the art to which it pertains, to practice the same. It is to be understood that the foregoing describes preferred embodiments and examples of the present technology and that modifications may be made therein without departing from the spirit or scope of the invention as set forth in the claims. Moreover, it is also understood that the embodiments shown in the drawings, if any, and as described above are merely for illustrative purposes and not intended to limit the scope of the invention. As used in this description, the singular forms "a," "an," and "the" include plural reference such as "more than one" unless the context clearly dictates otherwise. Finally, all references cited herein are incorporated in their entirety.

What is claimed:

1. A system for stabilizing a wheelchair comprising:
   at least one caster arm configured to maintain contact with a surface underlying the wheelchair, the at least one caster arm comprising:
   a force sensing system configured to measure a force exerted on the underlying surface by the at least one caster arm; and
   an actuator configured to adjust a position of the at least one caster arm to maintain a predetermined amount of force on the underlying surface based at least in part on the measured force, wherein the system is motorized and raises the position of the at least one caster arm when the measured force is greater than the predetermined amount of force and lowers the position of the at least one caster arm when the measured force is less than the predetermined amount of force.

2. The system of claim 1, further comprising a control system to control the actuator when the measured force deviates from the predetermined amount of force.

3. The system of claim 2, wherein the control system communicates with the force sensing system and the actuator using one of a wireless connection or a wired connection.

4. The system of claim 1, wherein the actuator includes a first end secured to the wheelchair and a second end secured to the at least one caster arm, the actuator pivots at least one of the first end or the second end in response to adjustment of the position of the at least one caster arm.

5. The system of claim 4, wherein the actuator is a motorized system comprising a linear motor.

6. The system of claim 1, wherein the at least one caster arm comprises a first and a second caster arm, the first caster arm located on a first side of the wheelchair and the second caster arm located on a second side of the wheelchair opposite the first side.

7. The system of claim 6, wherein the first caster arm operates independently of the second caster arm.

8. The system of claim 6, further comprising a mounting axis to which the first caster arm and the second caster arm are mounted.

9. The system of claim 8, wherein the first caster arm and the second caster arm pivot about the mounting axis in response to adjustment from the system.

10. The system of claim 6, further comprising a first mounting axis to which the first caster arm is secured to the wheelchair, and a second mounting axis to which the second caster arm is secured to the wheelchair.

11. A system for stabilizing a wheelchair comprising:
a plurality of caster arms configured to:
maintain a predetermined orientation of the wheelchair relative to a gravitational force; and
maintain contact with a surface underlying the wheelchair, wherein each caster arm of the plurality of caster arms is configured to maintain a predetermined amount of force on the underlying surface, wherein the plurality of caster arms comprises a first and a second caster arm, the first caster arm located on a first side of the wheelchair and the second caster arm located on a second side of the wheelchair opposite the first side,
wherein the first caster arm operates independently of the second caster arm;
an orientation sensor configured to measure a change in orientation of the wheelchair; and
a plurality of actuators configured to adjust a position of a respective caster arm of the plurality of caster arms based at least in part on the measured change.

12. The system of claim 11, further comprising a control system to control the plurality of actuators when the measured change is outside a threshold tolerance of the predetermined orientation.

13. The system of claim 12, wherein the control system is configured to activate the plurality of actuators to raise or lower the position of the first caster arm of the plurality of caster arms and raise or lower the position of the second caster arm of the plurality of caster arms based at least in part on the measured change.

14. The system of claim 11, in which the orientation sensor comprises one or more accelerometers or one or more gyroscopes.

15. The system of claim 11, in which the orientation sensor also comprises one or more magnetometers.

16. The system of claim 11, further comprising a calibration system to determine the predetermined amount of force and the predetermined orientation.

17. The system of claim 13, wherein the predetermined orientation is determined relative to a gravitational force measured at a seat of the wheelchair.

18. A system for stabilizing a wheelchair comprising:
a plurality of caster arms configured to:
maintain a predetermined orientation of the wheelchair relative to a gravitational force;
maintain contact with a surface underlying the wheelchair; and
maintain a predetermined amount of force on the underlying surface;
an orientation sensor configured to measure a change in orientation of the wheelchair;
a plurality of actuators configured to adjust a position of a respective caster arm of the plurality of caster arms based at least in part on the measured change; and
a calibration system to determine the predetermined amount of force and the predetermined orientation.

19. A system for stabilizing a wheelchair comprising:
a first caster arm configured to maintain contact with a surface underlying the wheelchair; and
a second caster arm configured to maintain contact with the surface underlying the wheelchair independently of the first caster arm, wherein the first caster arm is located on a first side of the wheelchair and the second caster arm is located on a second side of the wheelchair opposite the first side, each of the first and second caster arms comprising:
a force sensing system configured to measure a force exerted on the underlying surface by the respective caster arm; and
an actuator configured to adjust a position of the respective caster arm to maintain a predetermined amount of force on the underlying surface based at least in part on the measured force.

* * * * *